US011930852B2

(12) United States Patent
Wang et al.

(10) Patent No.: US 11,930,852 B2
(45) Date of Patent: Mar. 19, 2024

(54) PORTABLE ATOMIZATION GENERATING DEVICE

(71) Applicant: SHENZHEN INNOKIN TECHNOLOGY CO., LTD., Guangdong (CN)

(72) Inventors: Zhichang Wang, Shenzhen (CN); Rongbo Wang, Shenzhen (CN)

(73) Assignee: SHENZHEN INNOKIN TECHNOLOGY CO., LTD., Shenzhen (CN)

( * ) Notice: Subject to any disclaimer, the term of this patent is extended or adjusted under 35 U.S.C. 154(b) by 720 days.

(21) Appl. No.: 16/821,141

(22) Filed: Mar. 17, 2020

(65) Prior Publication Data
US 2020/0297033 A1 Sep. 24, 2020

(30) Foreign Application Priority Data

| Mar. 20, 2019 | (CN) | 201910212059.X |
| Mar. 20, 2019 | (CN) | 201920360475.X |
| Mar. 20, 2019 | (CN) | 201920360701.4 |
| Mar. 20, 2019 | (CN) | 201920360778.1 |
| Mar. 20, 2019 | (CN) | 201920360780.9 |
| Mar. 20, 2019 | (CN) | 201920362700.3 |
| Mar. 20, 2019 | (CN) | 201920362736.1 |

(51) Int. Cl.
*A24F 40/485* (2020.01)
*A24F 40/10* (2020.01)
*A24F 40/42* (2020.01)
*A24F 40/51* (2020.01)
*A24F 40/57* (2020.01)
*A24F 40/90* (2020.01)
*H02J 7/00* (2006.01)

(52) U.S. Cl.
CPC ............ *A24F 40/485* (2020.01); *A24F 40/10* (2020.01); *A24F 40/42* (2020.01); *A24F 40/51* (2020.01); *A24F 40/57* (2020.01); *A24F 40/90* (2020.01); *H02J 7/0045* (2013.01); *H02J 7/0063* (2013.01)

(58) Field of Classification Search
CPC ........ A24F 40/485; A24F 40/10; A24F 40/42; A24F 40/51; A24F 40/57
See application file for complete search history.

(56) References Cited

U.S. PATENT DOCUMENTS 10,517,334 B1* 12/2019 Volodarsky ............... A24F 1/30
2020/0214359 A1* 7/2020 Liu ......................... A24F 40/95
2020/0376210 A1* 12/2020 Simpson ................. A24F 40/50

* cited by examiner

*Primary Examiner* — Christopher M Rodd
*Assistant Examiner* — Jennifer A Kessie
(74) *Attorney, Agent, or Firm* — Millburn IP PLLC

(57) ABSTRACT

An atomization generating device includes a main body and a cartridge having an exterior housing and a bottom base. The exterior housing includes an opening at a lower portion, an air outlet at a top portion, and an open hole at a side wall. The bottom base is mounted at the opening of the lower portion of the exterior housing. An upper portion of the bottom base is provided with an atomizing core connected with the air outlet through a vapor channel. An upper portion of the main body includes a receiving chamber for receiving the cartridge. The receiving chamber includes an air inlet corresponding to the open hole. The bottom base includes an air guiding channel for guiding an external air into the atomizing core. An end of the air guiding channel is connected with the atomizing core, another end is connected with the air inlet and the open hole.

15 Claims, 24 Drawing Sheets

PORTABLE ATOMIZATION GENERATING DEVICE

CROSS-REFERENCE TO RELATED APPLICATIONS

This patent application claims priority to Chinese Invention Patent Application No. CN201910212059.X, filed on Mar. 20, 2019, and Chinese Utility Model Application Nos. CN201920360778.1, CN201920360701.4, CN201920360475.X, CN201920360780.9, and CN201920362700.3, and CN201920362736.1, all filed on Mar. 20, 2019. The entire contents of the above-mentioned applications are incorporated herein by reference.

TECHNICAL FIELD

The present disclosure relates to an atomization generating device, and more specifically, to a portable atomization generating device.

BACKGROUND

A currently available electronic cigarette, also known as an atomization generating device, is typically portable. The electronic cigarette includes a cartridge and a main body. An upper portion of the cartridge is provided with an electronic cigarette liquid ("E-liquid") storage tank, and a lower portion is provided with an atomizing core disposed on a bottom base. The bottom base includes an air inlet connected with the atomizing core. The upper portion of the cartridge is provided with an air outlet. The air inlet and the air outlet are connected through a vapor channel. A side wall of the vapor channel is provided with an E-liquid inlet. The E-liquid inlet is connected with the E-liquid storage tank. The atomizing core disposed on the bottom base is provided in the vapor channel. The atomizing core includes an E-liquid guiding body and a heating wire. The E-liquid guiding body absorbs the E-liquid from the E-liquid storage tank through the E-liquid inlet. The E-liquid stored in the E-liquid storage tank continuously flows to the E-liquid guiding body through the E-liquid inlet. After the heating wire heats the E-liquid already absorbed by the E-liquid guiding body to atomize the E-liquid, the E-liquid guiding body continues to absorb additional E-liquid from the E-liquid storage tank. The upper portion of the main body of the electronic cigarette (or atomization generating device) is provided with a receiving chamber. The lower portion of the main body is provided with an electrical circuit board and a battery. The electrical circuit board is connected with the battery. The atomizing core disposed in the cartridge is connected with the electrical circuit board. When a user operates the electronic cigarette, the atomizing core is electrically connected and powered such that the E-liquid guided in by the E-liquid guiding body is atomized. A gas generated from atomizing the E-liquid moves upwardly to flow out from the air outlet provided at the upper portion of the vapor channel. When this type of electronic cigarette is used, the cartridge is typically mounted inside the receiving chamber at the upper portion of the main body. An external air may enter a bottom portion of the cartridge through a gap located between an exterior wall of the cartridge and the receiving chamber. The external air flows upwardly along the air inlet disposed at the bottom portion of the cartridge. The external air further enters the atomizing core and mixes with the gas generated from atomizing the E-liquid. The mixture moves upwardly and flows out through the air outlet provided at the upper portion of the vapor channel, thereby accomplishing an exchange cycle between the atomizing core disposed inside the electronic cigarette and external air.

For a smooth air intake of the electronic cigarette and for reliable mounting of the cartridge, the size of the cartridge and the size of the receiving chamber need to be suitably matched. That is, the size of the gap between the exterior wall of the cartridge and the receiving chamber needs to be suitable. An overly large gap may cause the cartridge to be easy to become loose, which tends to result in an E-liquid leakage and other contamination. An overly small gap may render it difficult for the external air to enter the electronic cigarette, resulting in an insufficient amount of air intake for the electronic cigarette, which may affect the texture or taste of the atomized E-liquid. In a practical design, for reliable mounting of the cartridge to avoid contamination, the gap between the exterior wall and the receiving chamber may be maintained within a relatively small range. Nonetheless, during the manufacturing process, errors may occur in the size of the cartridge and the size of the receiving chamber. Such errors may result in an overly tight mounting of the cartridge inside the receiving chamber, which can result in an insufficient amount of air intake for the electronic cigarette.

When the electronic cigarette is used by a user, the cartridge is mounted to the receiving chamber disposed at the upper portion of the main body. The corresponding positive and negative conductive terminals respectively disposed at the bottom portion of the cartridge and at the receiving chamber are plug-connected with one another to provide an electric power to the atomizing core. The plug-connection configuration tends to cause the cartridge to be incorrectly plugged in a wrong direction, resulting in a switching of the electrodes of the conductive terminals disposed at the bottom portion of the cartridge. That is, the electric current in a heating member (e.g., a heating wire) no longer flows in the positive direction to provide the electric power normally. Instead, the electric current flows in a reversed direction to provide a reverse power supply. This type of electronic cigarette cannot avoid a reverse power supply. Long term use of this type of electronic cigarette tends to cause damages to the cartridge, rendering cartridge unusable.

In this type of portable electronic cigarette main body, the conductive terminals and the heating member of the atomizing core are typically welded together. When this type of cartridge is used, the connection between the heating member and the conductive terminals is not secure, and tends to break apart. This is because after the heating member is welded with the conductive terminals, the welded heating member and the conductive terminals are assembled with other elements in the manufacturing process, and in the assembling process, the heating member and the conductive terminals tend to separate apart due to poor quality welding, vibration, etc., which may render the product unusable.

In the meantime, this type of portable electronic cigarette main body is typically provided with a pressing-button switch at an exterior surface. The pressing-button switch may be pressed to trigger the operation of the atomizing core. This method of triggering the atomizing core through the pressing-button switch entails continuously pressing the pressing-button by a human hand, which is inconvenient for the user in practical operations. In addition, long-term pressing of the pressing-button switch tends to cause damages to the pressing-button switch, rendering the electronic cigarette unusable. In the meantime, it is common that the internal structure of this type of portable electronic cigarette is not reasonable, not compact, and the space utilization rate is not high.

SUMMARY

The objective of the present disclosure is to overcome the defects or disadvantages of the existing technologies. First, the present disclosure provides a new, portable atomization generating device. The portable atomization generating device includes an independent air intake structure. The atomization generating device includes various advantageous features. For example, the atomization generating device includes a novel design for air flow channels. The structure of the atomization generating device makes it easy for the external air to enter. In addition, with the atomization generating device, the texture of the gas generated from atomizing the E-liquid can be maintained or enhanced.

The independent air intake structure provided by various embodiments of the present disclosure may be configured to connect the atomizing core with the external air. That is, the independent air intake structure may provide an independent air channel for the external air to enter the atomization generating device, which is different from the conventional air intake channel provided through the gap between the exterior wall of the cartridge and the receiving chamber as included in a conventional atomization generating device. The independent air intake structure provides an air intake channel for the external air to enter the atomizing core, which is independent of a conventional design, thereby enabling a sufficient air intake to be provided for the atomization generating device, which enhances the texture of the gas generated from atomizing the E-liquid.

Compared with the conventional design, in the disclosed new design, the manner in which the external air enters the atomizing core is drastically changed. The air intake is no longer limited by the size of the gap between the cartridge and the receiving chamber and the manufacturing precision. Accordingly, the issue of insufficient air intake caused by the size of the gap between the cartridge and the receiving chamber being too small is resolved.

The portable atomization generating device including the independent air intake structure may include:
- a cartridge including an exterior housing. An opening may be provided at a lower portion of the exterior housing. A top portion of the exterior housing may be provided with an air outlet, i.e., a cigarette mouthpiece. A side wall of the exterior wall may be provided with an open hole. The cartridge may also include a bottom base mounted at the opening provided at the lower portion of the exterior housing. An atomizing core may be provided at an upper portion of the bottom base. The atomizing core and the cigarette mouthpiece may be connected through a vapor channel;
- a main body including a receiving chamber provided at an upper portion for receiving the cartridge. A side wall of the receiving chamber may be provided with an air inlet. The air inlet of the main body may correspond to the open hole on the exterior housing of the cartridge, such that the external air can be guided into the cartridge;

In the disclosed structure, an air guiding channel may be provided at the bottom base of the cartridge. An end of the air guiding channel may be connected with the atomizing core. Another end of the air guiding channel may be connected with the open hole on the exterior housing of the cartridge and the corresponding air inlet on the main body.

The air guiding channel may be configured to guide the external air into the atomizing core.

In some embodiments, the air guiding channel may be a bottom base through hole extending throughout the inside of the bottom base and connected with the atomizing core. The bottom base through hole may be directly connected with the open hole of the exterior housing of the cartridge and the corresponding air inlet on the main body that aligns with the open hole, which can guide the external air into the atomizing core.

In some embodiments, the bottom base through hole may include at least one first channel disposed inwardly. Each first channel may bend and extend upwardly to provide a second channel. The second channel may be located below the atomizing core and may be connected with the atomizing core.

In some embodiments, the bottom base may have more than one bottom base through hole, for example two. In such embodiments, the two first channels of the two bottom base through holes may be distributed opposingly. Each first channel may be connected with a second channel, through which the first channel may be connected with the atomizing core.

In some embodiments, the air guiding channel disposed at the bottom base may be an air guiding groove concavely and inwardly disposed at an exterior surface at a lower portion of the bottom base. An end of the air guiding groove may be connected with an external environment through the open hole on the exterior housing of the cartridge and the corresponding air inlet of the main body that is aligned with the open hole. Another end of the air guiding groove may be connected with the atomizing core through the bottom base through hole. In some embodiments, the first channel of the bottom base through hole may be provided at an inner wall of the air guiding groove.

When the air guiding groove is concavely and inwardly disposed in a ring shape at the exterior surface of the bottom base, i.e., when the air guiding groove includes a ring shape, and is circularly disposed at the exterior surface at a lower portion of the bottom base, the atomization generating device of the present disclosure may also be referred to as a side air intake circular flow type atomization generating device. The side air intake circular flow type atomization generating device includes various advantageous features. For example, the atomization generating device include a novel air channel design. The structure of the atomization generating device makes it easy for the external air to enter. In addition, with the atomization generating device, the texture of the gas generated from atomizing the E-liquid can be maintained or enhanced. In some embodiments, the two opposingly distributed first channels may be located at two opposing sides of the ring-shaped air guiding groove.

An embodiment of the present disclosure also provides a portable atomization generating device, which includes a snap-fitting structure. The snap-fitting structure may be formed by a snap-fitting opening provided at a side wall of the exterior housing of the cartridge and a protrusion provided at the bottom base of the cartridge. The open hole at the side wall of the exterior housing of the cartridge may be configured as the snap-fitting opening. The protrusion may be disposed at the bottom base of the cartridge at a location corresponding to the snap-fitting opening. The protrusion may be configured to couple or engage with the snap-fitting opening to securely mount the bottom base to the exterior housing of the cartridge through the snap-fitting manner.

In some embodiments, a gap is pre-configured between the protrusion and the snap-fitting opening to allow the external air to enter the air guiding channel conveniently.

In some embodiments, a connection groove may be concavely and inwardly disposed at an exterior surface of the protrusion. The connection groove may be connected with the external environment through the snap-fitting opening disposed at the side wall of the exterior housing of the cartridge. The connection groove may be in a gaseous connection with the atomizing core through the air guiding groove.

In some embodiments, the protrusion may include an upper surface facing in a direction toward the cigarette mouthpiece, a lower surface facing in a direction toward the bottom base, and an exterior surface facing in a direction toward an external environment of the electronic cigarette. An inner surface of the protrusion may be fused with the exterior surface of the bottom base.

In some embodiments, the connection groove may be disposed inwardly and downwardly from the exterior surface of the protrusion. In addition, the connection groove extends outwardly to penetrate throughout a lower surface of the protrusion. The air guiding groove may be horizontally disposed below the protrusion and is connected with the connection groove.

In some embodiments, the connection groove may be disposed inwardly and upwardly from the exterior surface of the protrusion. The connection groove extends outwardly to penetrate throughout the upper surface of the protrusion. The air guiding groove may be horizontally disposed above the protrusion and may be connected with the connection groove.

In some embodiments, the connection groove may be disposed at a middle or center portion of the protrusion to penetrate throughout the upper and lower surfaces of the protrusion, and may be interposingly connected with the air guiding groove that is concavely disposed at an exterior surface of the bottom base in a direction toward an inner surface of the protrusion.

To further improve the sealing of the cartridge, a rubber ring may be sleeve-fit onto an upper portion of the bottom base. The bottom base and the exterior housing may be sealed by the rubber ring. The rubber ring may be located above the protrusion.

Compared to the conventional design, the atomization generating device having the independent air intake structure provided by the present disclosure drastically changes the manner in which the external air enters the atomizing core. The issue related to the size of the gap between the cartridge and the receiving chamber in the conventional design is resolved. Accordingly, the issue related to an insufficient amount of air intake caused by the sizes of the cartridge and the receiving chamber is resolved. The disclosed atomization generating device may include an air inlet provided at an exterior wall of the receiving chamber. The external air enters the snap-fitting opening of the cartridge through the air inlet, and sequentially flows through the connection groove, the air guiding groove, the first channel, and the second channel. The gas generated by atomizing, by the atomizing core, the E-liquid may be guided to the cigarette mouthpiece through the vapor channel. Accordingly, the atomized E-liquid (which is turned into the gas) may be guided out timely. As a result, the deficiency of having an insufficient air intake amount due to the size of the gap being too small can be avoided. In addition, the texture of the atomized E-liquid can be enhanced. The disclosed atomization generating device can more thoroughly atomize the E-liquid, thereby increasing the fineness of the texture.

Embodiments of the present disclosure also provide a portable atomization generating device, which includes a reverse power supply avoidance function. The atomization generating device having the reverse power supply avoidance function can avoid the occurrence of reverse plugging that may provide a reverse power supply to the atomizing core. The atomization generating device having the reverse power supply avoidance function may include:

a cartridge including an exterior housing and a bottom base mounted at an opening provided at a lower portion of the exterior housing. The bottom base may include a center line extending between a top and a bottom of the bottom base (e.g., in an up-down direction). An atomizing core may be mounted at an upper portion of the bottom base. The atomization generating device may also include a main body including a bottom housing. A battery, a control assembly, and a plastic member may be mounted inside the bottom housing at a lower portion of the bottom housing. The plastic member may include a first end wall located at an upper portion of the plastic member and a second end wall located at a lower portion of the plastic member. The battery and the control assembly may be mounted between the first end wall and the second end wall. A receiving chamber may be formed by an upper portion of the first end wall and an upper side wall of the bottom housing. The receiving chamber may be configured to receive and mount the cartridge. The battery may be connected with the control assembly, which are together configured to provide an electric power to the atomizing core and control the operation of the atomizing core.

In some embodiments, corresponding engageable connection members may be provided at the bottom base of the cartridge and at the plastic member of the main body. The connection members may be configured to connect the cartridge and the plastic member only in a predetermined direction such that electric power may be supplied to the atomizing core in a fixed electric current direction.

According to an embodiment of the present disclosure, the engageable connection members may form or include a foolproof structure, including a first snap-connecting member disposed at a lower surface of the bottom base and a second snap-connecting member disposed at an upper surface of the first end wall.

When the cartridge is loaded into the receiving chamber along the center line, the first snap-connecting member and the second snap-connecting member may be engaged with one another such that the cartridge can be correctly loaded into the receiving chamber. When the cartridge is rotated for an angle around the center line, the first snap-connecting member and the second snap-connecting member may not be engaged with one another, and the cartridge may not be correctly loaded into the receiving chamber. In some embodiments, the angle for which the cartridge is rotated around the center line may be $\theta$, where $0°<\theta<180°$ or $\theta=180°$.

In some embodiments, a second groove may be provided at a lower surface of the bottom base. The first snap-connecting member may be the second groove. The first end surface may be provided with a first air guiding channel. The first air guiding channel may protrude from an upper surface of the first end wall. The second snap-connecting member may be the first air guiding channel protruding from the first end wall. The first air guiding channel may be inserted at a location of the second groove where the cartridge may be correctly loaded into the receiving chamber.

In some embodiments, the atomizing core and the cigarette mouthpiece may be connected through the vapor channel. The bottom base may be provided with an air guiding groove. A first channel may be inwardly provided at an inner wall of the air guiding groove. The first channel may bend upwardly and extend to form or provide a second channel. The first channel may also bend downwardly and extend to form or provide a third channel. A first snap-fitting hole may be provided at a side wall of the exterior housing. The air guiding groove may correspond to the first snap-fitting hole. A protrusion may be provided at a portion of the bottom base corresponding to the first snap-fitting hole. The protrusion may be mounted at the first snap-fitting hole. A first gap may be pre-configured between the protrusion and the first snap-fitting hole to allow the external air to conveniently enter the air guiding groove through the first gap. The bottom housing may be provided with an air inlet. The air inlet may be connected with the receiving chamber. The air inlet may correspond to the first snap-fitting hole.

In some embodiments, a first groove may be provided at an upper surface of the first end wall. The air guiding groove may include a ring shape and may be circularly disposed at an exterior surface of a lower portion of the bottom base. The air guiding groove may be horizontally disposed. When observed in a horizontal direction, the second channel and the third channel may not be located on a same straight line.

In some embodiments, a center portion of the bottom base may be provided with lead terminals and a first magnet. The lead terminals and the first magnet may be exposed at the lower surface of the bottom base. The first end wall may be provided with connection terminals and a second magnet. The connection terminals and the second magnet may be exposed at the upper surface of the first end wall. When the cartridge is correctly loaded into the receiving chamber, the lead terminals and the connection terminals may be connected to establish an electrical connection therebetween. The first magnet and the second magnet may attract one another to bring the cartridge and the main body into tight or close contact.

In some embodiments, two lead terminals and two first magnets may be located on a same straight line L1. The first snap-connecting member may not be located on the straight line L1. Two connection terminals and two second magnets may be located on a same straight line L2. The second snap-connecting member may not be located on the straight line L2.

In some embodiments, a cross section may be defined. The center line may be perpendicular to the cross section. The cross section of the cartridge or the bottom housing may include two long sides and two short sides. The two long sides may be opposingly configured. The two short sides may be opposingly configured. The long sides and the short sides may be connected. A length of a long side may be greater than a length of a short side.

The atomization generating device having the foolproof structure provided by the embodiments of the present disclosure may include a reverse plugging avoidance feature. That is, when the cartridge is loaded into the receiving chamber along the center line, the first snap-connecting member and the second snap-connecting member are engaged with one another, such that the cartridge can be correctly loaded into the receiving chamber. Under this circumstance, the lead terminals and the connection terminals are connected to establish an electrical connection therebetween. The first magnet and the second magnet attract one another to bring the cartridge and the main body into tight or close contact, thereby realizing the normal operation of the electronic cigarette. When the cartridge is rotated around the center line for an angle, the first snap-connecting member and the second snap-connecting member are not engaged with one another, and the cartridge cannot be correctly loaded into the receiving space. The lead terminals and the connection terminals are not electrically connected. As a result, the electronic cigarette cannot operate normally. This configuration can effectively maintain the normal and orderly operation of the electronic components included in the cartridge, and avoid damages to the electronic components caused by a reverse flow of the electric current.

According to an embodiment of the present disclosure, a third end wall may be provided between the first end wall and the second end wall of the plastic member of the main body. The control assembly may be disposed between the first end wall and the third end wall. A snap cover may be provided between the first end wall and the third end wall. The snap cover may cover the control assembly. The battery may be mounted between the second end wall and the third end wall. The engageable connection members may include an electrical circuit adapter disposed at the third end wall. The electrical circuit adapter may include a first socket, a second socket, and a third socket. The first socket and the third socket may be located on two sides of the second socket, and may be symmetrically distributed with respect to the second socket as a center. The first socket, the second socket, and the third socket may be respectively connected with the control assembly. The second end wall may also be provided with a third magnet. The first socket, the second socket, the third socket, and the third magnet may be exposed at the third end wall.

In some embodiments, the control assembly may include an electrical circuit board. A side of the electrical circuit board may be provided with an LED lamp and a light absorbing cover. The snap cover may be provided with a lamp hole. A light hole may be provided at a portion of the bottom housing corresponding to the lamp hole. A light transmissive member may be provided at the lamp hole. A portion of the light transmissive member may be located at the light hole. The light generated by the LED lamp may be emitted out through the light transmissive member. The light absorbing cover may be disposed surrounding the LED lamp. A side of the light absorbing cover may abut against the electrical circuit board. Another side of the light absorbing cover may abut against an inner wall of the snap cover.

In some embodiments, a cross section may be defined. The cross section may be parallel to the first end wall. A cross section of the plastic member may include two long sides of the plastic member and two short sides of the plastic member. The two long sides of the plastic member may be opposingly disposed. The two short sides of the plastic member may be opposingly disposed. The long sides and the short sides of the plastic member may be connected. A length of the long side of the plastic member may be greater than a length of the short side of the plastic member. An opening may be provided at one of the long sides of the plastic member. A longitudinal groove may be provided at another long side of the plastic member. A snap-fitting groove may be provided at a bottom portion of the bottom housing. A snap protrusion may be provided at a bottom portion of the plastic member. The snap protrusion may be snap-fit with the snap-fitting groove.

In some embodiments, the device may also include a charging base. The charging base may include a charging exterior housing and a charging body. The charging exterior housing may include an opening at an upper portion. The charging exterior housing may wrap around the charging body. A charging docking chamber may be provided at the charging exterior housing and an upper surface of the charging body. A bottom portion of the main body of the electronic cigarette may be configured to mount the charging docking chamber. The charging body may be provided with a first charging terminal, a second charging terminal, and a third charging terminal. The first charging terminal and the third charging terminal may be respectively located at two sides of the second charging terminal, and may be symmetrically distributed with respect to the second charging terminal. The first charging terminal may be inserted into the first socket. The second charging terminal may be inserted into the second socket. The third charging terminal may be inserted into the third socket.

In some embodiments, the charging body may be provided with a fourth magnet. The fourth magnet and the third magnet may attract one another. The first charging terminal, the second charging terminal, and the third charging terminal may be located on a same straight line.

In some embodiments, two fourth magnets may be respectively located at two sides of the first charging terminal and the third charging terminal. The two fourth magnets, the first charging terminal, the second charging terminal, and the third charging terminal may be located on the same straight line.

In some embodiments, two third magnets may be respectively located at two sides of the first socket and the third socket. The two third magnets, the first socket, the second socket, and the third socket may be located on the same straight line.

The atomization generating device having the reverse power supply avoidance function provided by the embodiments of the present disclosure can realize a function of dual-conversion blind-insertion. That is, the first socket and the third socket of the electrical circuit adapter are respectively located at two sides of the second socket, and are symmetrically distributed with respect to the second socket. In a charging process, the charging base can be sleeve-fit at the bottom portion of the main body of the electronic cigarette. A user may not need to consider whether the direction of the charging base is positive or reversed. In the disclosed design, the battery and the control assembly have a reasonable configuration in the plastic member. The design is ingenious, which utilizes the limited space in a reasonable manner. The structure is compact, and the disassembling process is convenient. Docking for power supply or charging can be realized through insertion in a positive or a reversed direction, which improves the convenience of operation.

An embodiment of the present disclosure provides an atomization generating device configured with a sensor-triggering feature. The atomization generating device includes features such as being sensitive to an external trigger, being capable of avoiding back flow, and having a novel design. That is, the control assembly may include an airflow sensor and a sealing assembly. The sealing assembly may include a receiving groove and an air guiding tube. The receiving groove may be connected with the air guiding tube. The airflow sensor may be disposed at the receiving groove. The first end wall may be provided with a first air guiding channel. A lower portion of the first air guiding channel may be connected with an upper portion of the air guiding tube. An upper portion of the first air guiding channel may be connected with a lower portion of the third channel.

In some embodiments, the first air guiding channel may protrude from an upper surface of the first end wall. A lower surface of the bottom base may be provided with a second groove. The second groove may be located at the circumference of the third channel. A top portion of the first air guiding channel may be inserted into the second groove. The first air guiding channel may protrude from a lower surface of the first end wall. The air guiding tube may be located above the receiving groove. The lower portion of the first air guiding channel may be inserted into the upper portion of the air guiding tube.

In some embodiments, when observed in a horizontal direction, the second channel and the third channel may not be located on a same straight line.

In some embodiments, an upper surface of the first end wall may be provided with a first groove. The air guiding groove may include a ring shape and may be circularly disposed at an exterior surface of a lower portion of the bottom base. The air guiding groove may be horizontally disposed. Two first channels may be provided inwardly at an inner wall of the air guiding groove. The two first channels may be respectively located at two opposing sides of the air guiding groove. Each first channel may be provided with a third channel extending downwardly. Two third channels may be opposingly disposed. One of the two third channels may be connected with the first air guiding channel, the other one of the two third channels may be connected with the first groove.

The operations of triggering the electronic cigarette through an airflow sensor, when combined with the design of the air intake channels, can significantly increase the convenience of operation for a user. When the user uses the electronic cigarette, the two hands of the user are freed. The disclosed electronic cigarette may not need the user to press a pressing button. Based on the change in the pressure inside the air intake channel, operations of the electronic cigarette can be controlled based on sensing signals provided by an airflow sensor. The disclosed electronic cigarette can effectively enhance the texture. The design of the electronic cigarette is novel. The triggering is timely, and the operations are convenient.

The present disclosure also provides a press-connection method for terminals of the atomization generating device, and an atomization generating device manufactured with terminals connected using the disclosed press-connection method. The atomization generating device includes features such as secure connections and a long lifetime.

In some embodiments, the bottom base of the cartridge of the atomization generating device may include a support member, a center rod, a loading hole, a connecting wall, an insertion hole, and a passing hole. A diameter of the insertion hole may be greater than a diameter of the passing hole. The atomizing core of the cartridge may include an E-liquid guiding body and a heating member. Two ends of the heating member may each include an extending member. When the atomizing core is pushed downwardly, the extending member may enter the passing hole and arrive at the insertion hole, and ultimately protrude from a lower surface of the bottom base. A lower portion of the E-liquid guiding body may be press-connected with the loading hole. The cartridge may also include a rubber sleeve. The rubber sleeve may include a sleeve hole configured to receive the extending member inserted therethrough. The cartridge may also include lead terminals configured to insert into the sleeve hole of the rubber sleeve, such that an exterior wall of the lead terminals presses the extending member. By adopting the tight pressing method, the reliability of the connection is significantly enhanced. The scenarios of falling off or separating of parts of the electronic cigarette under an external force can be avoided. The scenarios of the heating member and the connection terminals being separated from one another caused by the assembling process and external forces can be effectively avoided.

In some embodiments, an end of the extending member may be fixed such that the connection terminals can be inserted upwardly into the sleeve hole, thereby tightly mounting the extending member between the connection terminals and the sleeve hole.

In some embodiments, the rubber sleeve may be inserted upwardly into the insertion hole, such that the rubber sleeve abuts against a top wall of the insertion hole.

In some embodiments, the extending member may be moved downwardly to protrude from a lower surface of the bottom base. After a lower portion of the E-liquid guiding body is press-connected with the loading hole, when the extending member is pulled downwardly with a force, the E-liquid guiding body may tightly press the loading hole.

The press-connection method for press-connecting the terminals of the atomization generating device may include the following steps:

a. providing a bottom base. A support member and a center rod may extend upwardly from the bottom base. A loading hole may be downwardly provided at an upper surface of the support member. The center rod may be located inside the support member. An inner wall of the support member and an exterior wall of the center rod may be at least partially hollowed out. A bottom portion of the center rod and a bottom portion of the support member may be connected through a connecting wall. The method may also include providing an insertion hole disposed upwardly from a lower surface of the bottom base. The insertion hole may extend throughout the connecting wall, and may form a passing hole at the connecting wall. A diameter of the insertion hole may be greater than a diameter of the passing hole.

b. providing an atomizing core. The atomizing core may include an E-liquid guiding body and a heating wire. The heating wire may be wounded around the E-liquid guiding body. Two ends of the heating wire respectively may each include an extending member. The extending member may be disposed at an inner side of the support member. The E-liquid guiding body may be aligned with the loading hole. When the atomizing core is pushed downwardly, the extending member may enter the hollowed out area of the inner wall of the support member and the exterior wall of the center rod. When the atomizing core is further pushed downwardly, the extending member may enter the passing hole, and may enter the insertion hole along the passing hole. Ultimately, the extending member may protrude from a lower surface of the bottom base. A lower portion of the E-liquid guiding body may be press-connected with the loading hole.

c. providing a rubber sleeve having a sleeve hole. The extending member may be inserted into the sleeve hole, and the rubber sleeve may be mounted in the insertion hole.

d. providing lead terminals. The lead terminals may be inserted into the sleeve hole, such that an exterior wall of the lead terminals presses the extending member.

In step d, an end of the extending member may be fixed, and the lead terminals may be inserted upwardly into the sleeve hole, such that the extending member is tightly fixed between the lead terminals and the sleeve hole.

In step c, the rubber sleeve may be mounted upwardly into the insertion hole, such that the rubber sleeve abuts against a top wall of the insertion hole.

In step b, the extending member may be moved downwardly to protrude from a lower surface of the bottom base. After a lower portion of the E-liquid guiding body is press-connected with the loading hole, the extending member may be pulled downwardly by a force, such that the E-liquid guiding body tightly presses the loading hole.

After step d, the method may also include providing a pedestal. The pedestal may include a separator wall located at a lower portion. The separator wall may include a separator hole. A connecting chamber may be provided upwardly from a lower surface of the separator wall. A boss may extend upwardly from a top portion of the separator wall and bend inwardly. The boss may penetrate throughout a pedestal hole between top and bottom of the boss. The pedestal hole may be connected with the connecting chamber. The pedestal may be disposed at an upper portion of the support member, such that the separator hole is press-connected with the E-liquid guiding body.

After step d, the method may also include providing an exterior housing. The exterior housing has the same or similar features as the exterior housing described above in the above embodiments.

The present disclosure adopts a press-connection method to establish a connection between the heating wire to the lead terminals. Using the tight pressing method, the security of the connection is significantly enhanced. The scenarios of falling off or separating of parts of the electronic cigarette under an external force can be avoided. The scenarios of the heating wire and the lead terminals being separated from one another caused by the assembling process and external forces can be effectively avoided.

BRIEF DESCRIPTION OF THE DRAWINGS

To better explain the technical solutions of the present disclosure and of the conventional technologies, the accompany drawings that are referred to when describing the present disclosure or the conventional technologies will be briefly introduced. Obviously, the accompanying drawings described below are only some embodiments of the present disclosure. A person having ordinary skills in the art can derive other drawings based on these drawings without creative labor.

DETAILED DESCRIPTION OF THE EMBODIMENTS

The technical solution of the embodiments of the present disclosure will be described in detail with reference to the accompanying drawings. The described embodiments are merely some embodiments of the present disclosure, and are not all embodiments of the present disclosure. Based on the embodiments of the present disclosure, a person having ordinary skills in the art can obtain other embodiments without creative labor. Such embodiments all fall within the scope of protection of the present disclosure.

Figure 1:
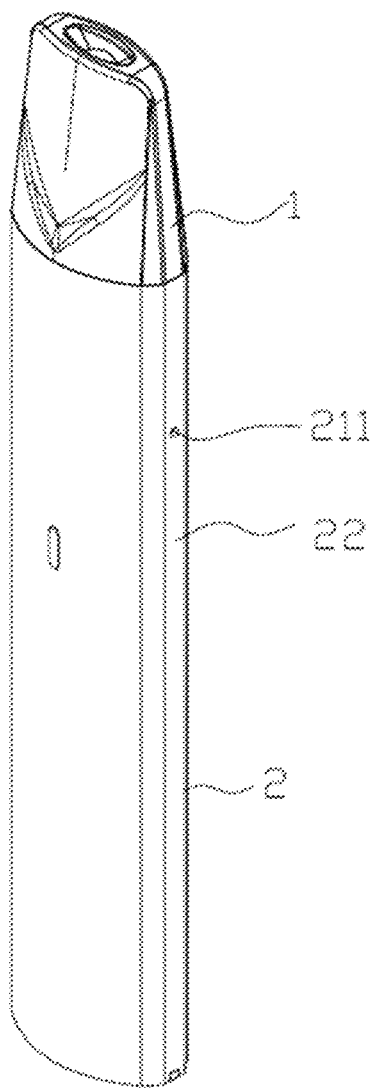
FIG. 1 is an overall perspective view of an electronic cigarette according to an embodiment of the present disclosure.
Figure 2:
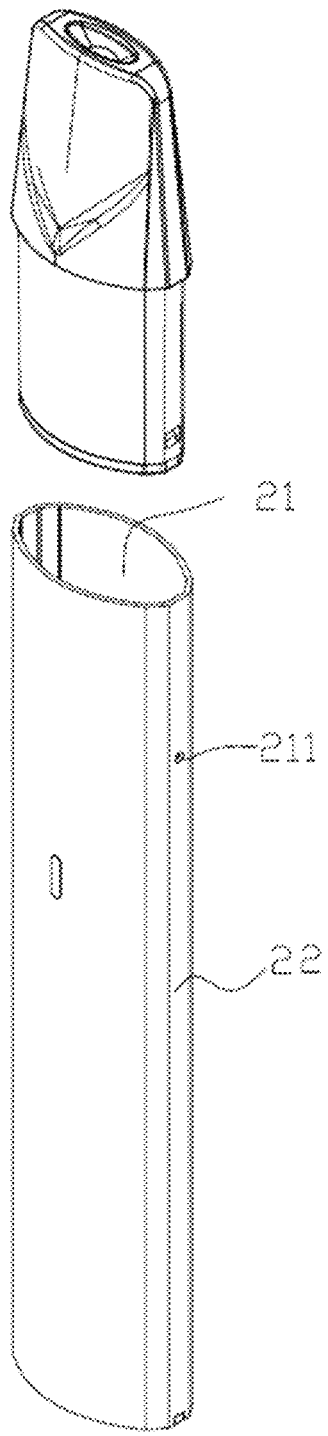
FIG. 2 is an exploded view of the overall perspective view of the electronic cigarette shown in FIG. 1, according to an embodiment of the present disclosure.
Figure 3:
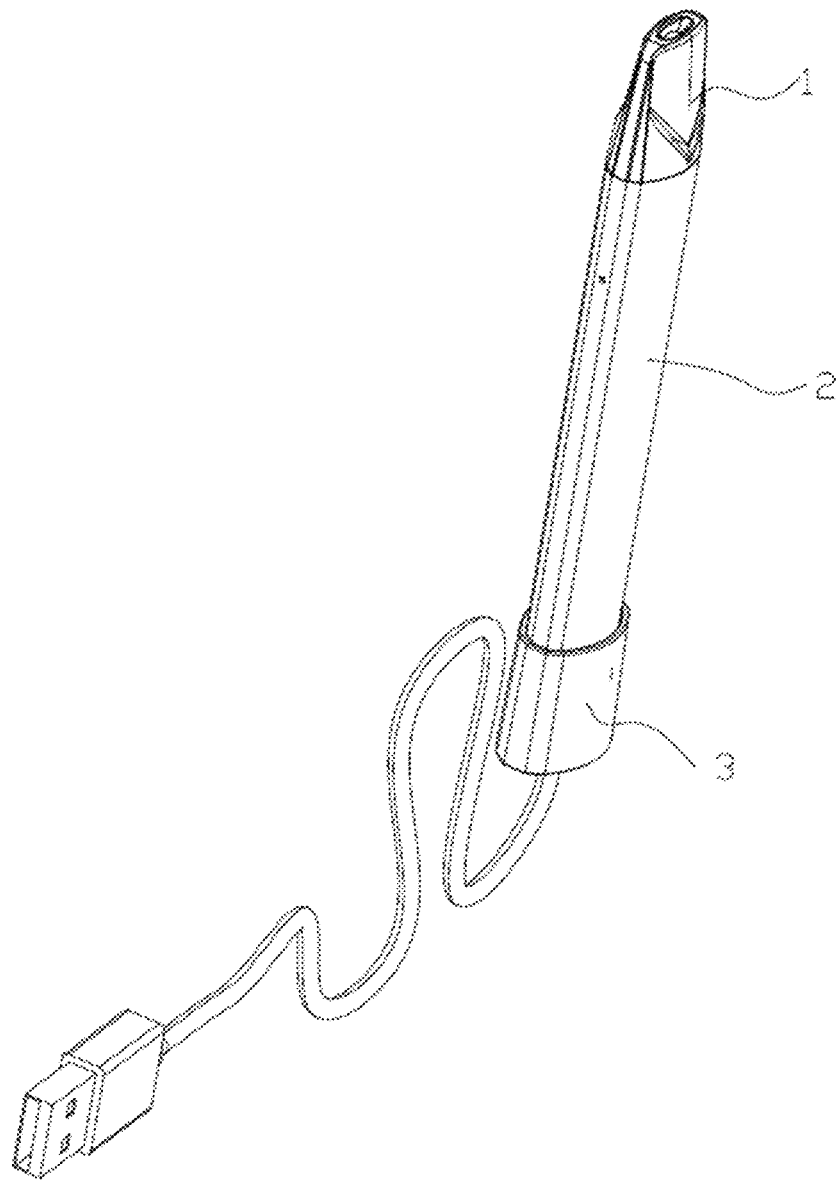
FIG. 3 is another overall perspective view of the electronic cigarette according to an embodiment of the present disclosure.
Figure 4:
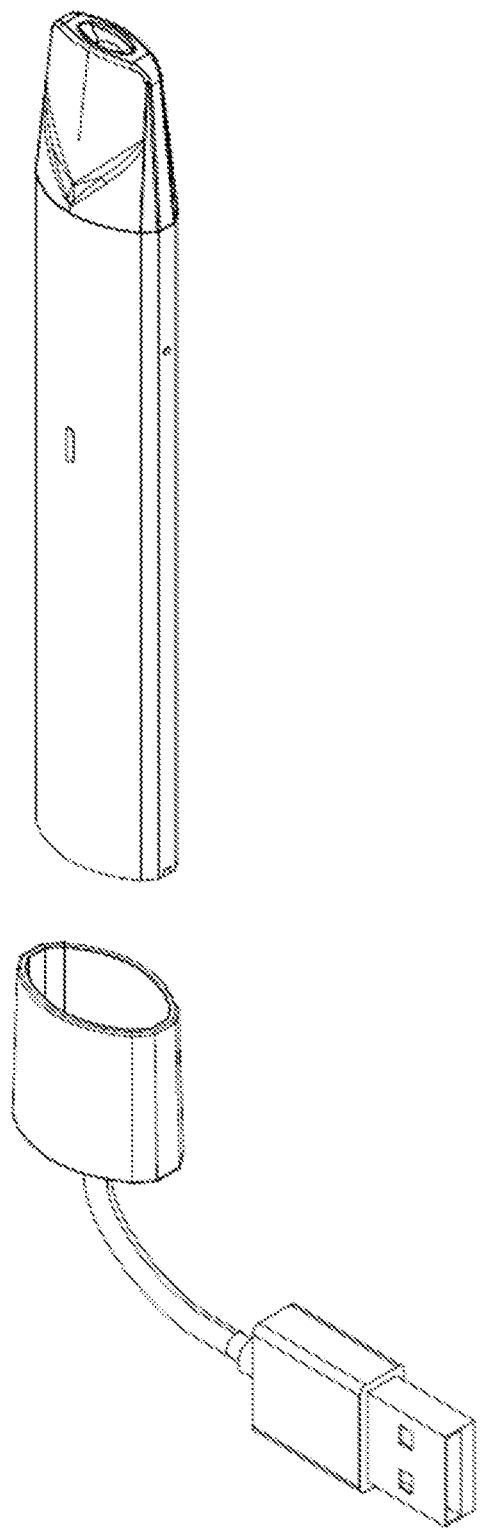
FIG. 4 is an exploded view of the overall perspective view of the electronic cigarette shown in FIG. 3, according to an embodiment of the present disclosure.
Figure 5:
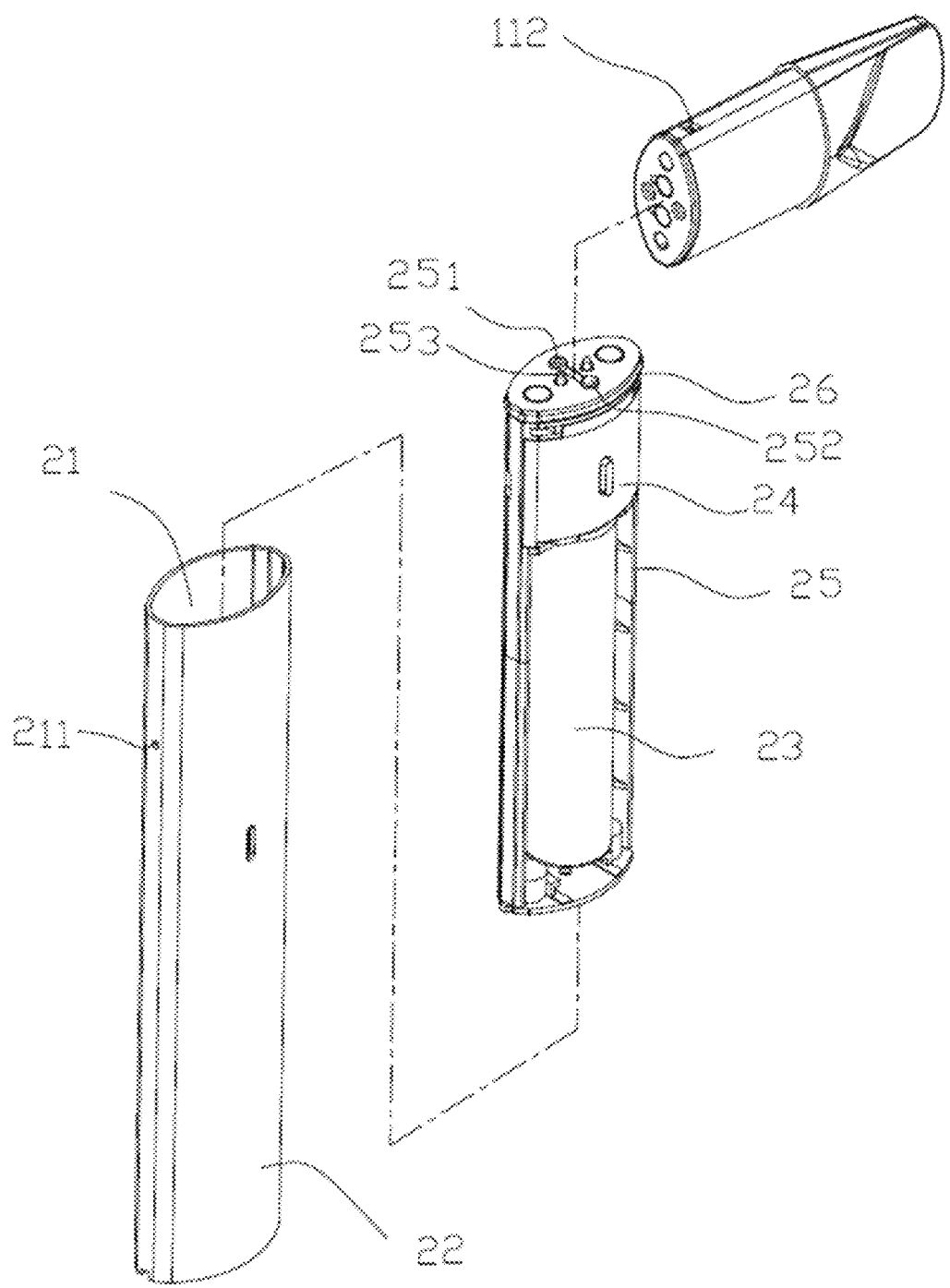
FIG. 5 is a further exploded view of the overall perspective view of the electronic cigarette shown in FIG. 1, according to an embodiment of the present disclosure.
Figure 6:
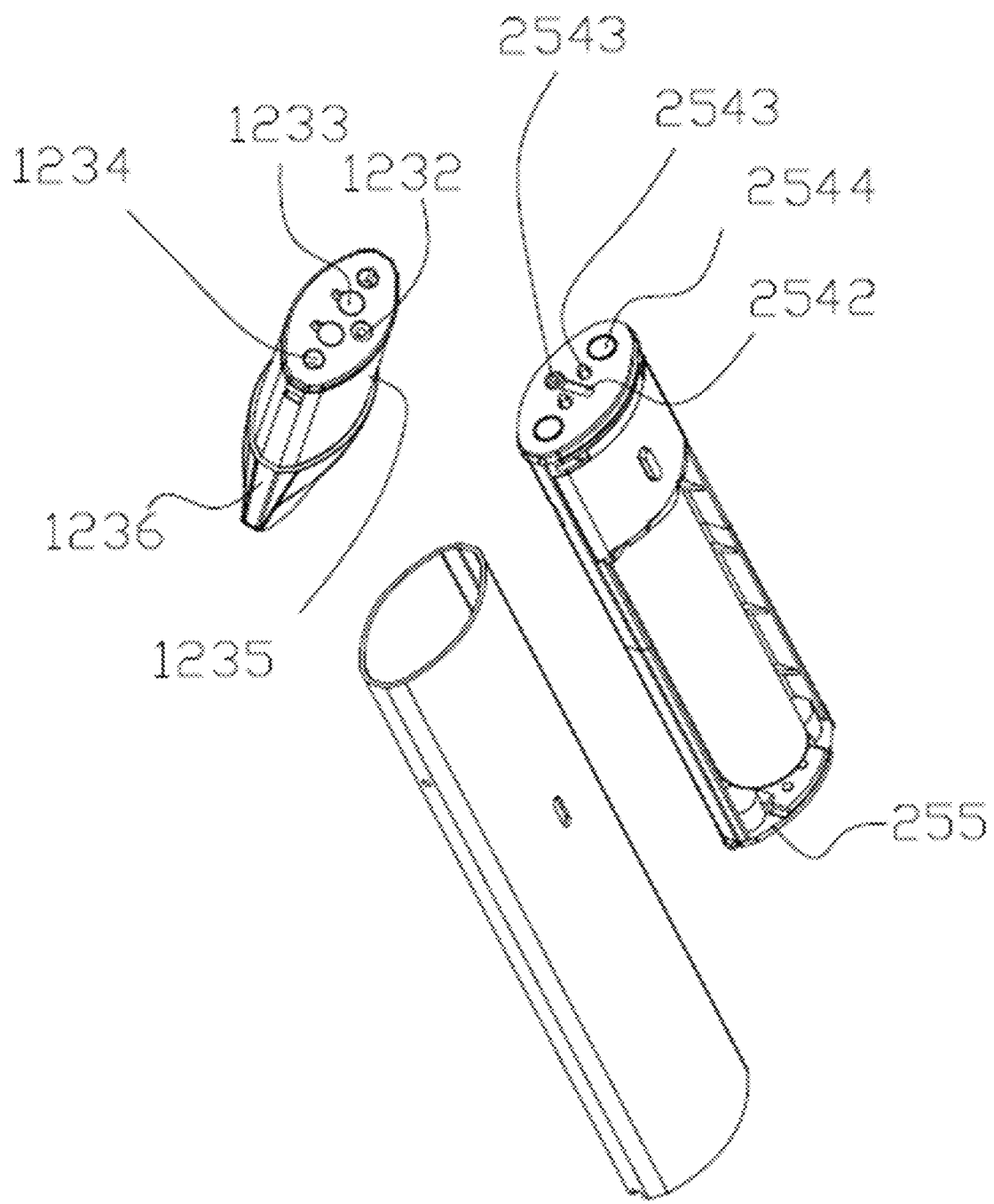
FIG. 6 is a further exploded view of the overall perspective view of the electronic cigarette shown in FIG. 1, according to an embodiment of the present disclosure.
Figure 7A:
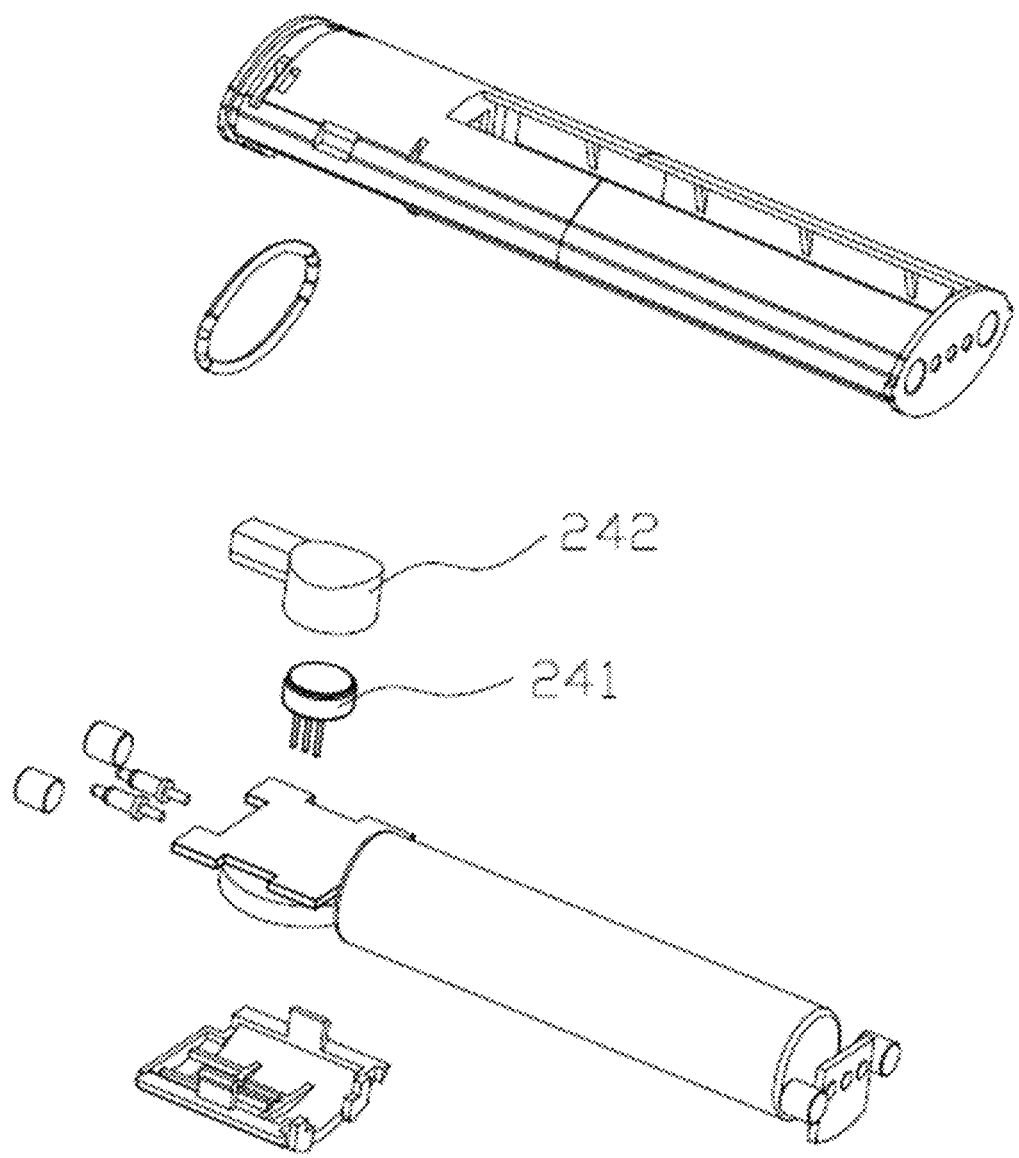
FIG. 7A is an exploded perspective view of a main body of the electronic cigarette, according to an embodiment of the present disclosure.
Figure 7B:
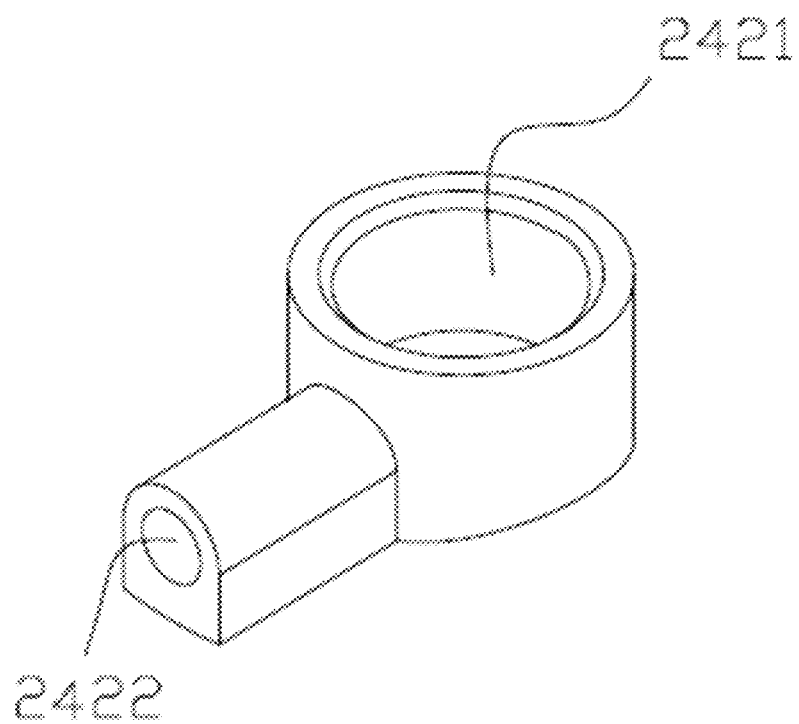
FIG. 7B is a perspective view of a sealing assembly according to an embodiment of the present disclosure.
Figure 8:
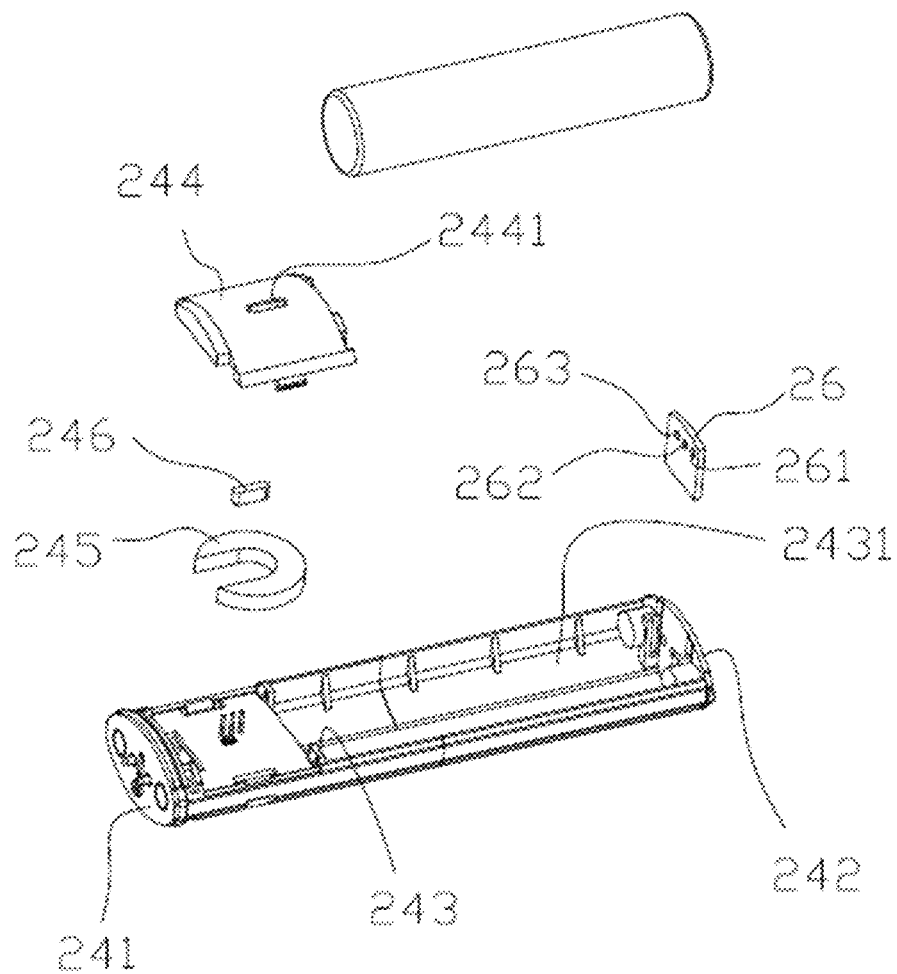
FIG. 8 is another exploded perspective view of a main body of the electronic cigarette, according to an embodiment of the present disclosure.
Figure 9:
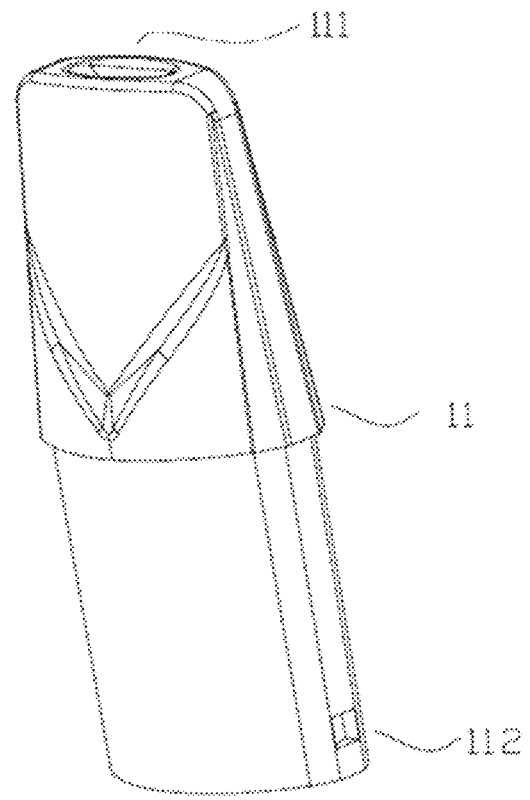
FIG. 9 is an exploded perspective view of a cartridge and a bottom base of the electronic cigarette, according to an embodiment of the present disclosure.
Figure 9:
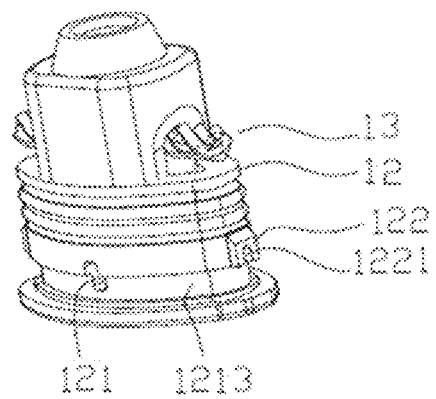
Figure 10:
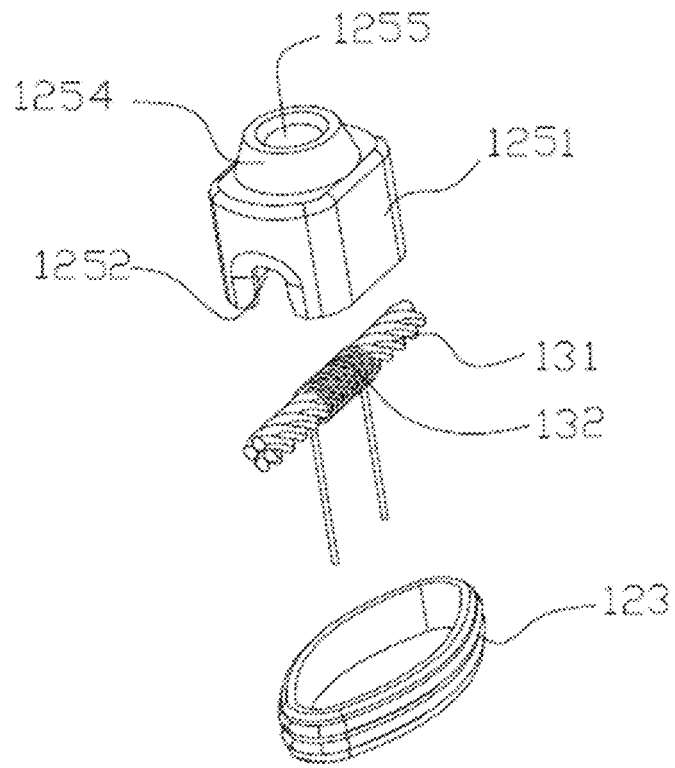
FIG. 10 is a further exploded perspective view of the bottom base of the electronic cigarette, according to an embodiment of the present disclosure.
Figure 10:
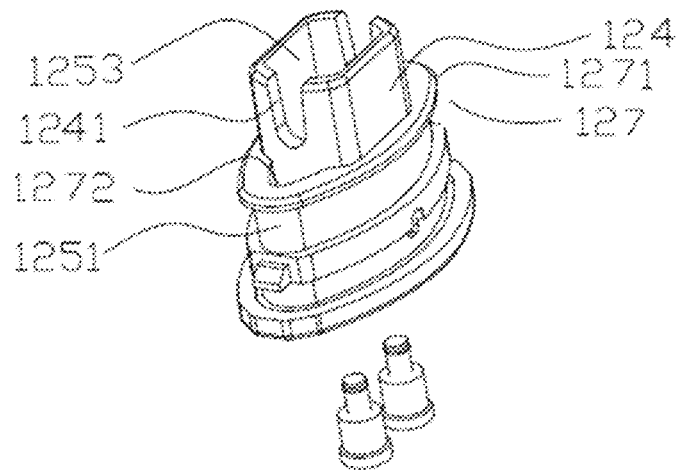
Figure 11:
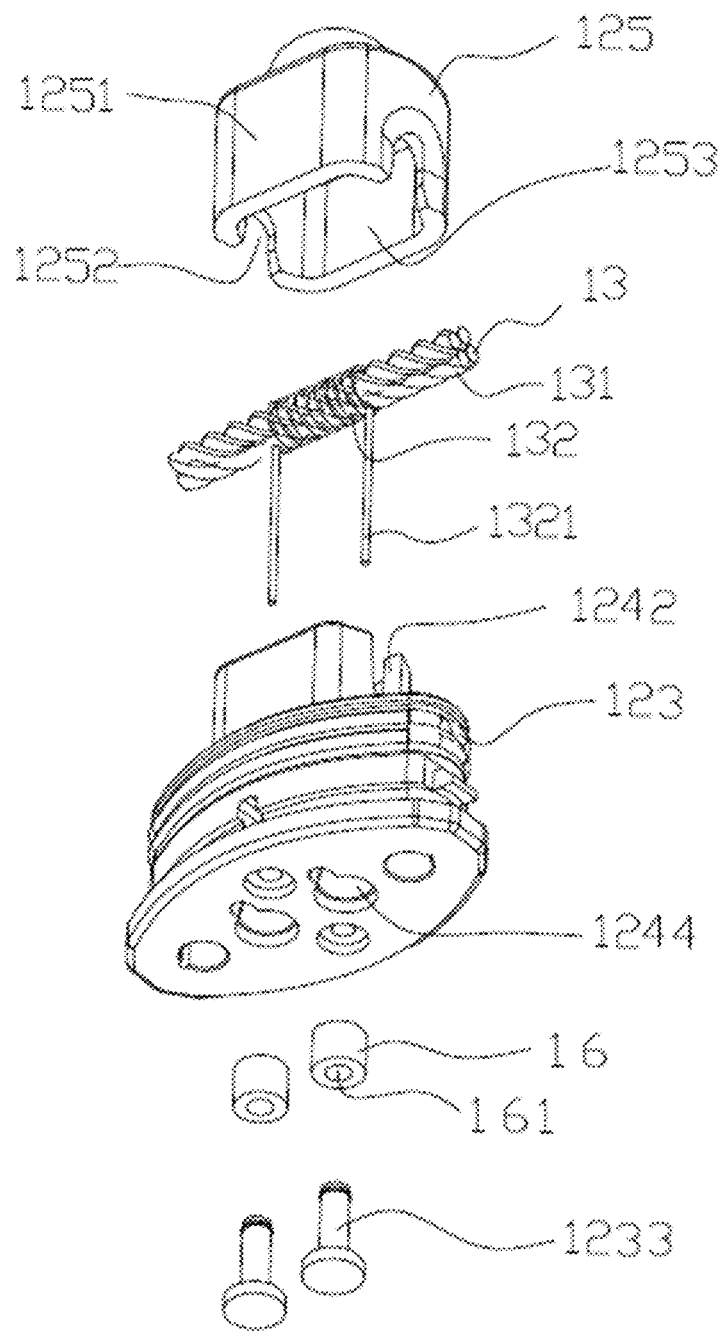
FIG. 11 is another exploded perspective view of the bottom base of the electronic cigarette, according to an embodiment of the present disclosure.
Figure 12:
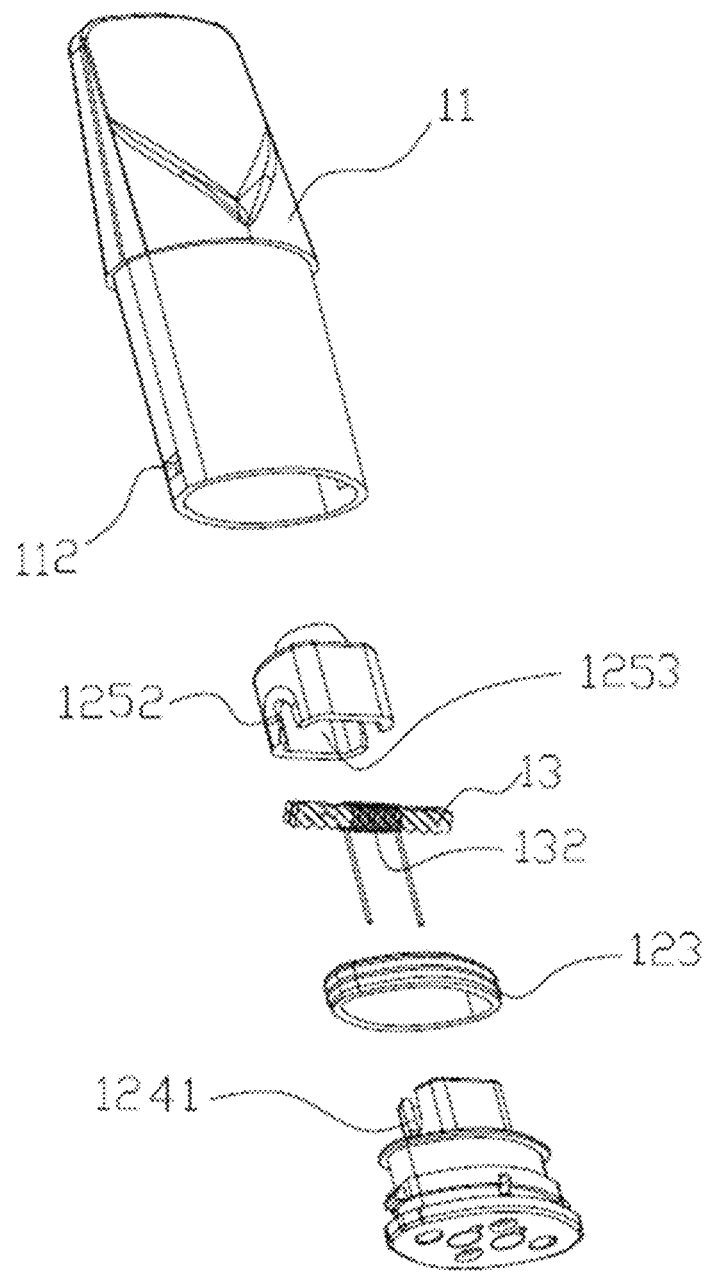
FIG. 12 is an exploded perspective view of the cartridge of the electronic cigarette, according to an embodiment of the present disclosure.
Figure 13A:
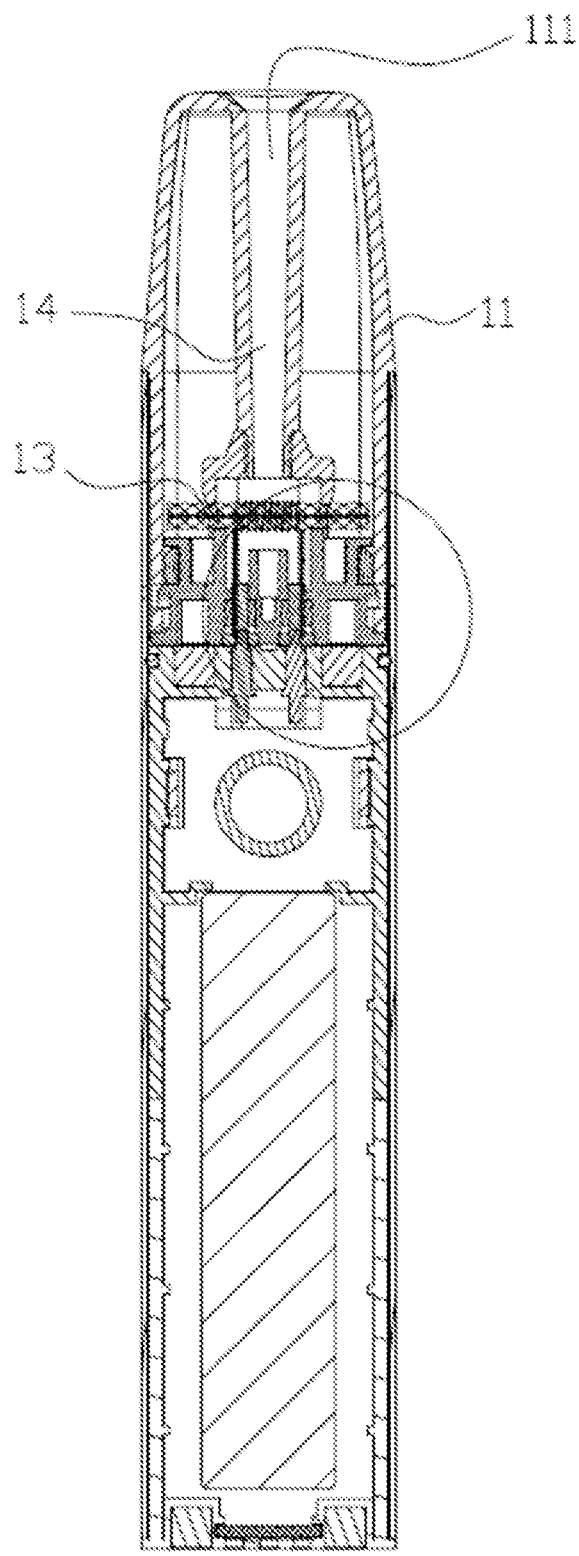
FIG. 13A is an overall cross-sectional view of the electronic cigarette, according to an embodiment of the present disclosure.
Figure 13B:
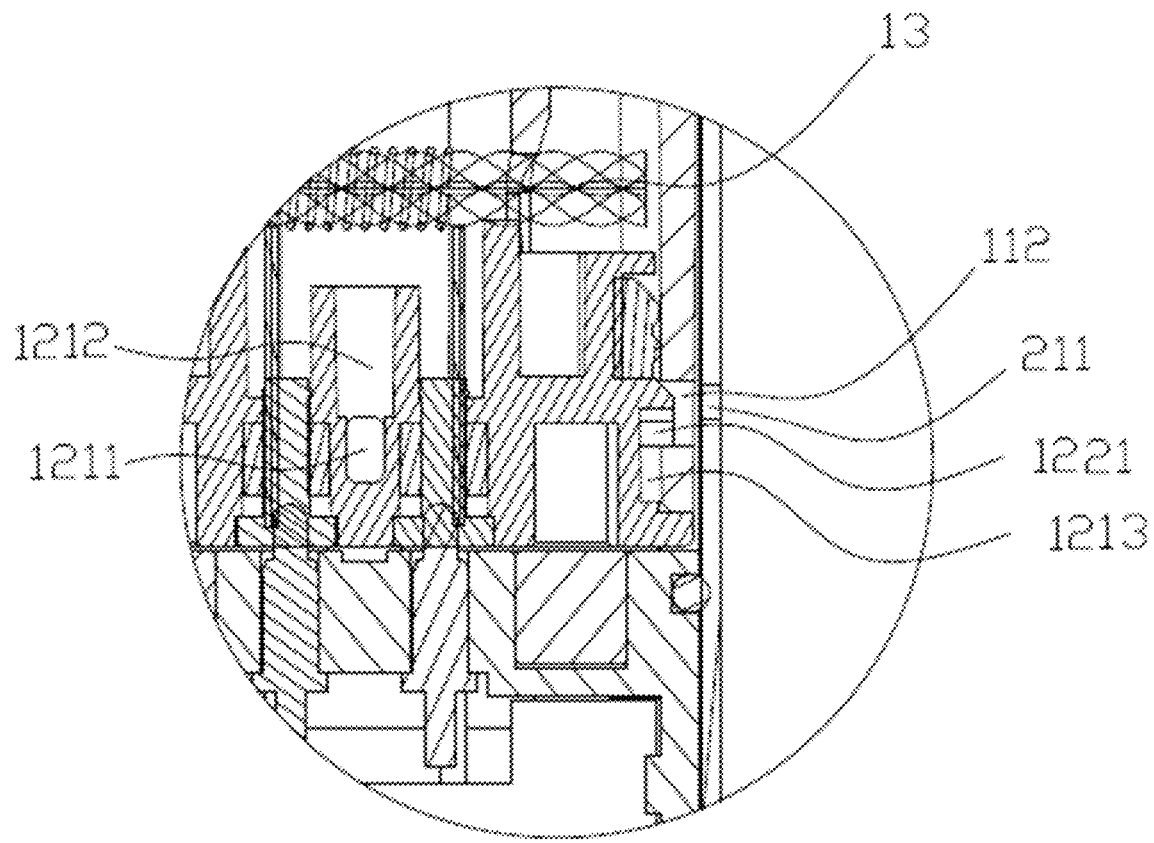
FIG. 13B is an enlarged, partial cross-sectional view of the circled portion of the electronic cigarette shown in FIG. 13A, according to an embodiment of the present disclosure.
Figure 14A:
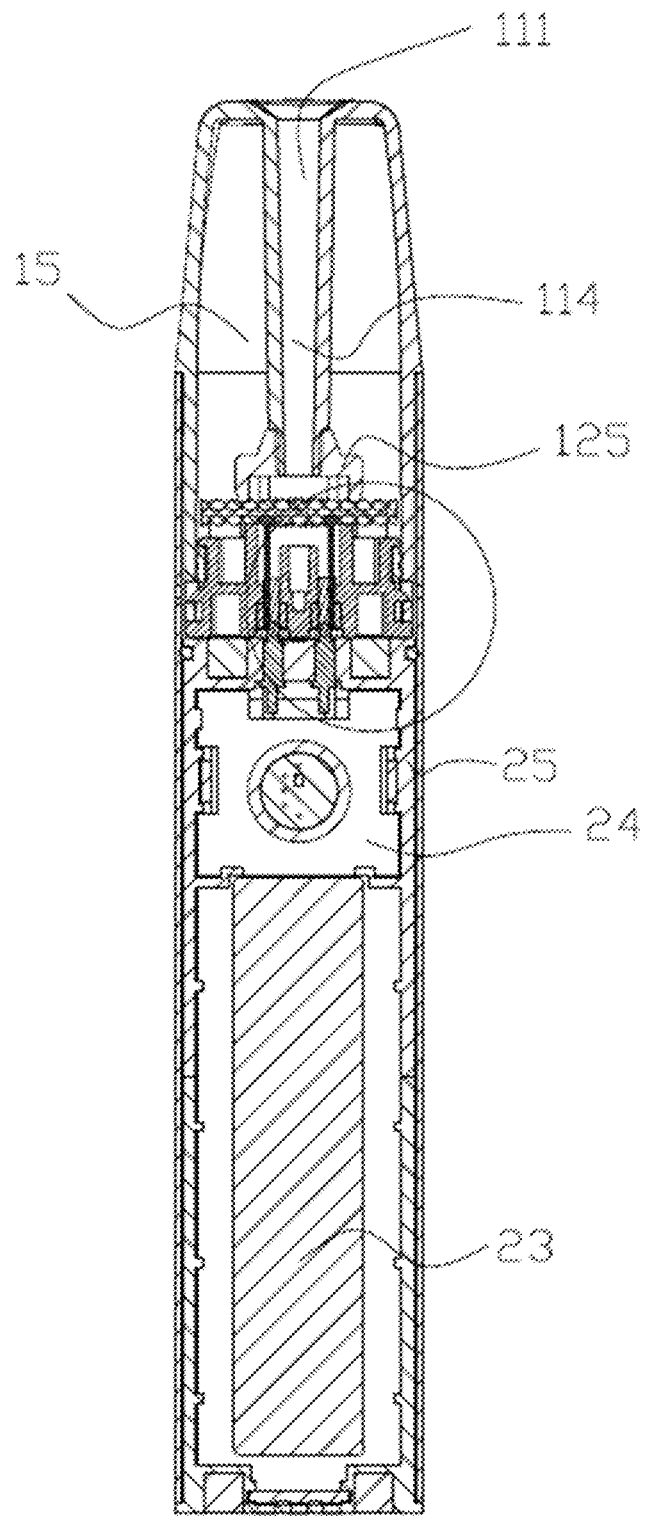
FIG. 14A is another overall cross-sectional view of the electronic cigarette, according to an embodiment of the present disclosure.
Figure 14B:
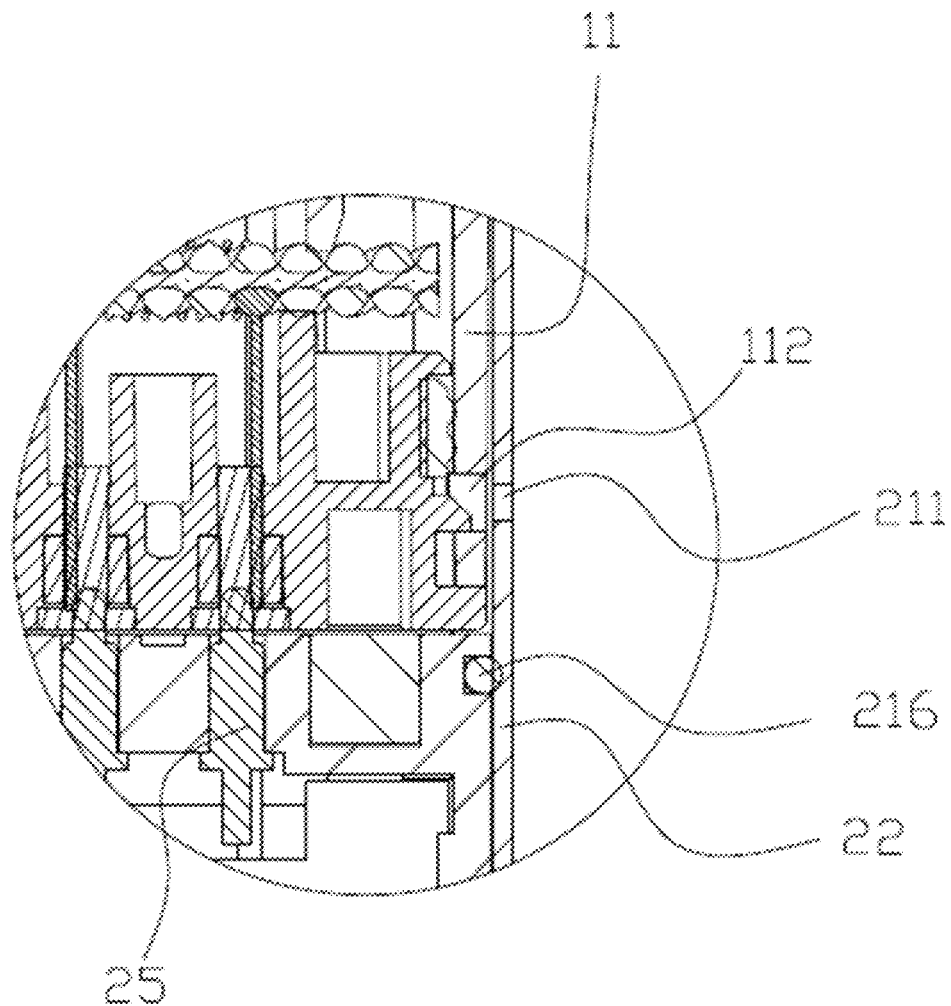
FIG. 14B is another enlarged, partial cross-sectional view of the circled portion of the electronic cigarette shown in FIG. 14A, according to an embodiment of the present disclosure.
Figure 15A:
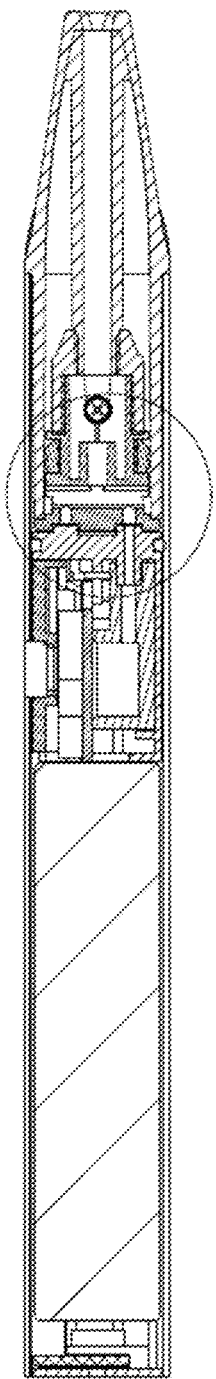
FIG. 15A is another overall cross-sectional view of the electronic cigarette, according to an embodiment of the present disclosure.
Figure 15B:
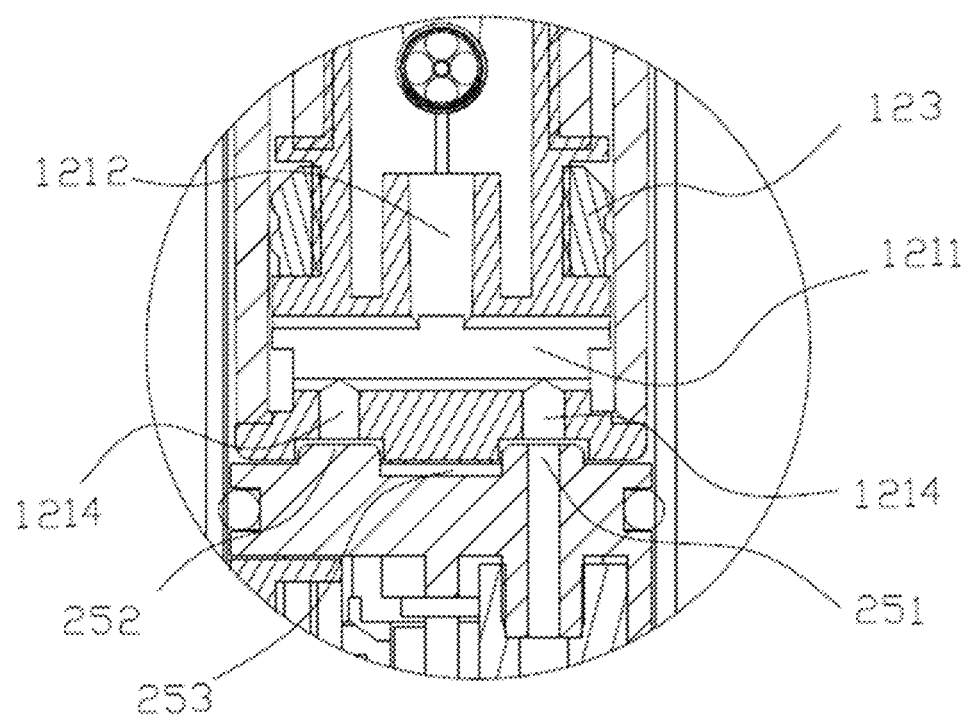
FIG. 15B is another enlarged, partial cross-sectional view of the circled portion of the electronic cigarette shown in FIG. 15A, according to an embodiment of the present disclosure.
Figure 16A:
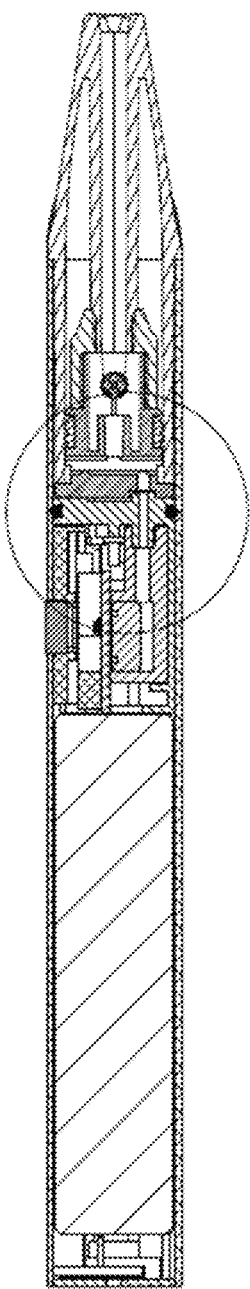
FIG. 16A is another overall cross-sectional view of the electronic cigarette, according to an embodiment of the present disclosure.
Figure 16B:
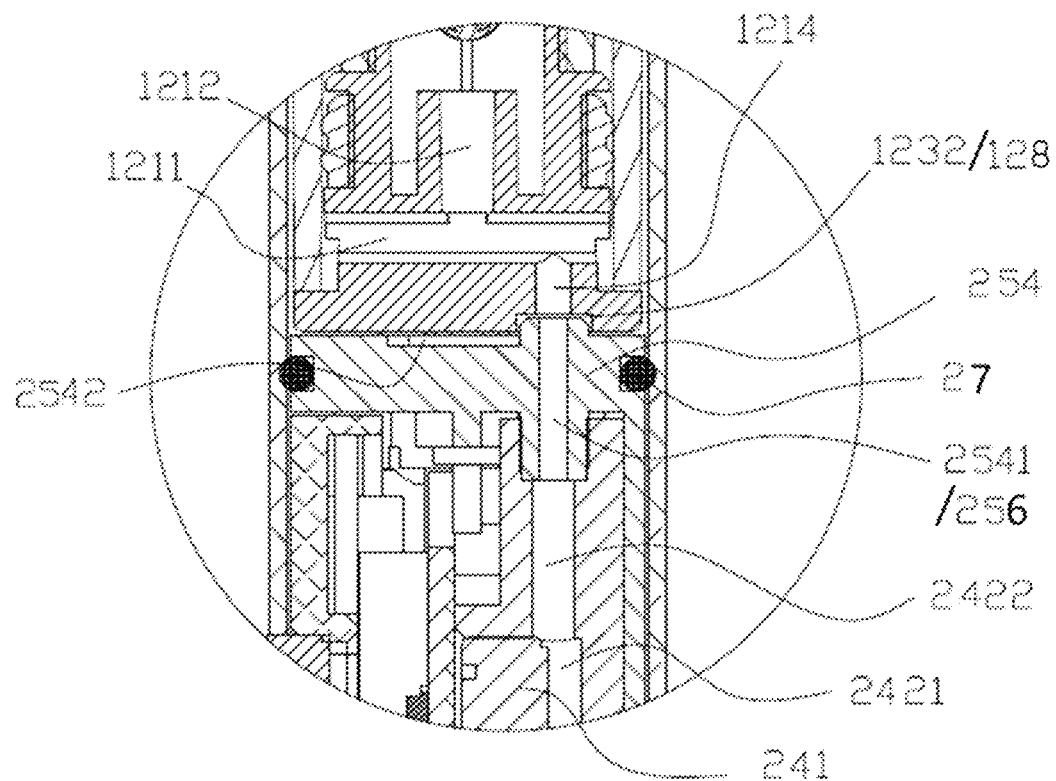
FIG. 16B is another enlarged, partial cross-sectional view of the circled portion of the electronic cigarette shown in FIG. 16A, according to an embodiment of the present disclosure.
Figure 17:
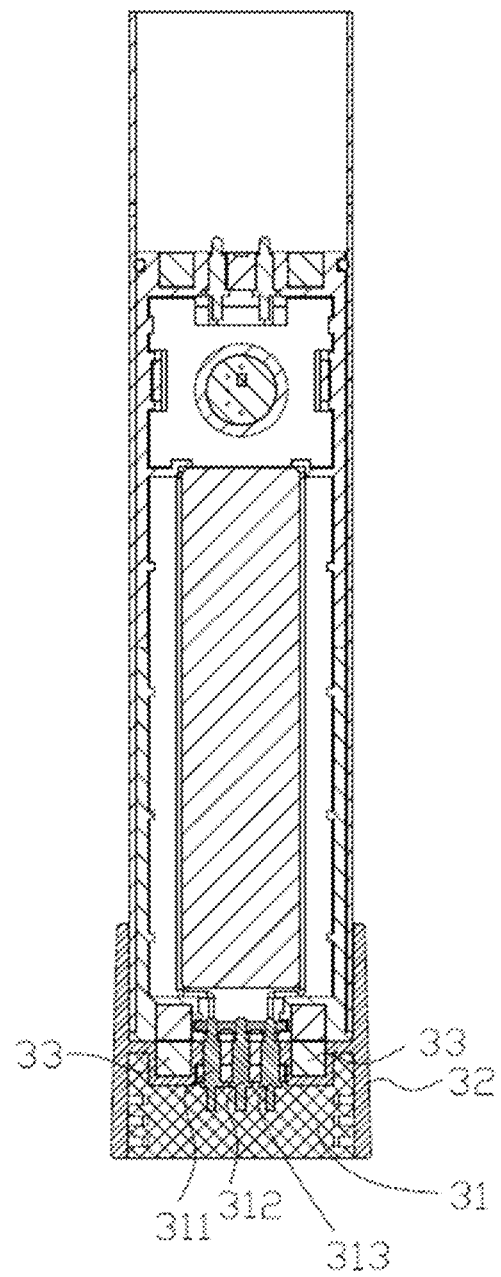
FIG. 17 is a cross-sectional view of a main body and a charging base of the electronic cigarette, according to an embodiment of the present disclosure.
Figure 18A:
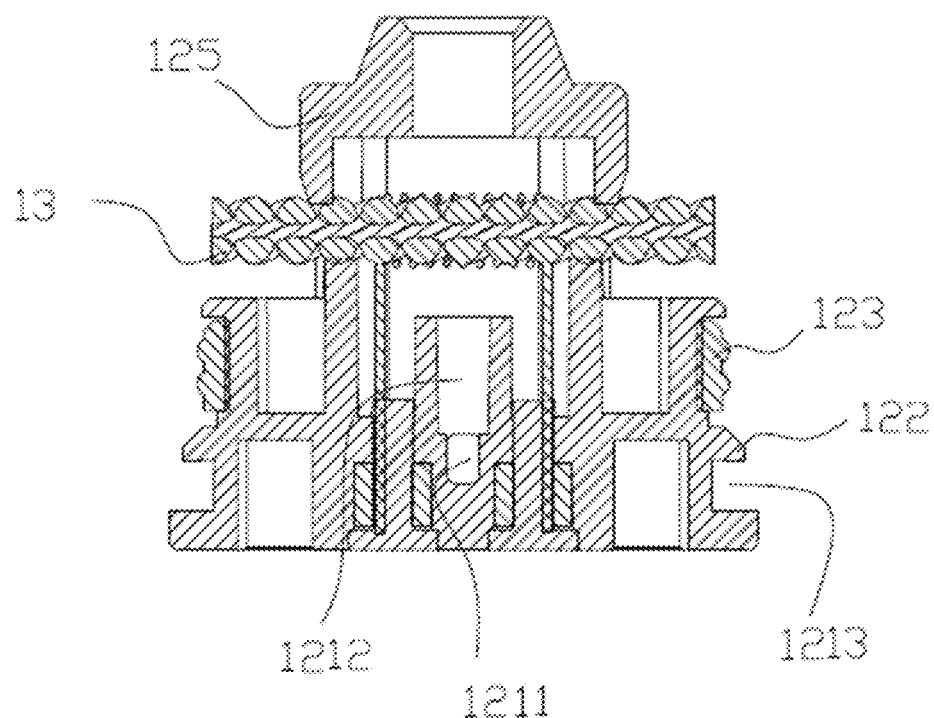
FIG. 18A is a cross-sectional view of the bottom base of the electronic cigarette, according to an embodiment of the present disclosure.
Figure 18B:
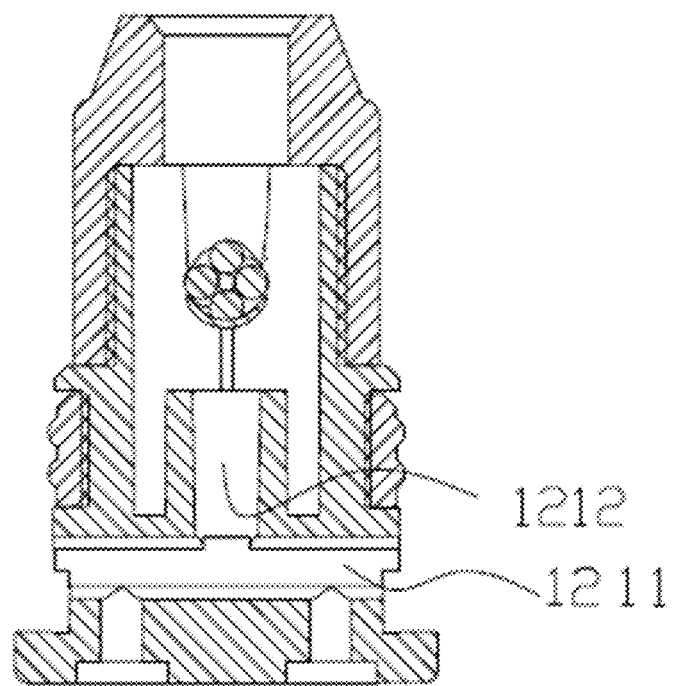
FIG. 18B is another cross-sectional view of the bottom base of the electronic cigarette, according to an embodiment of the present disclosure.
Figure 19:
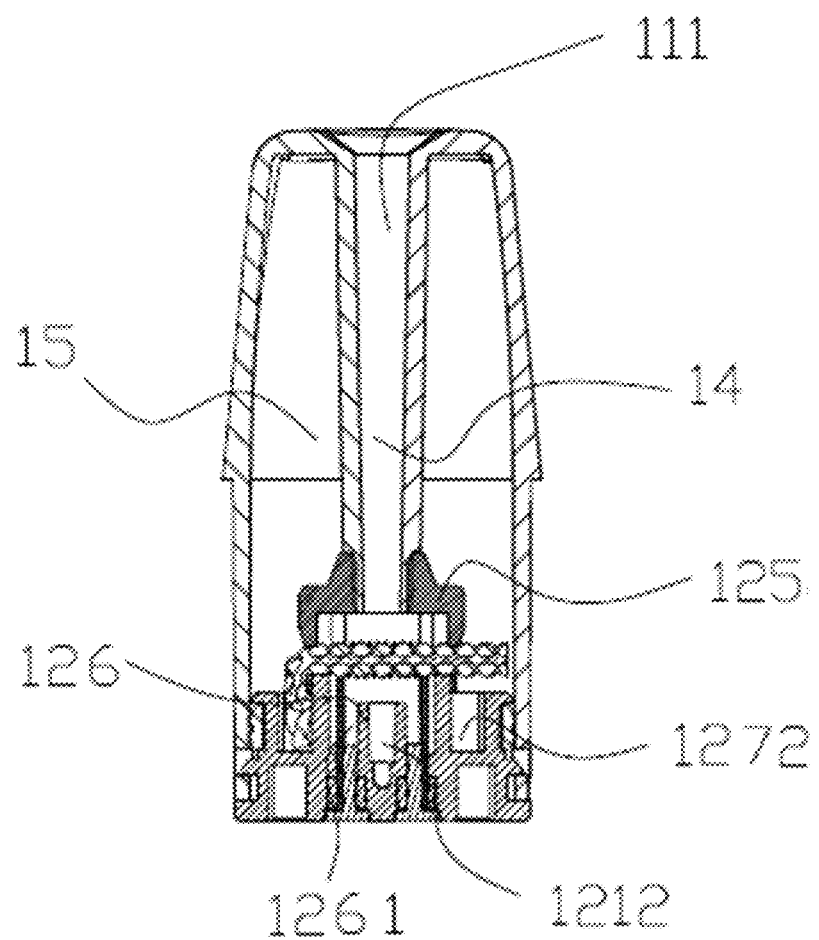
FIG. 19 is a cross-sectional view of the cartridge of the electronic cigarette, according to an embodiment of the present disclosure.

As shown in FIG. 1-FIG. 19, embodiments of the present disclosure provide an atomization generating device having an independent air intake structure. The atomization generating device may include a cartridge 1 including an exterior housing 11. A cigarette mouthpiece 111 may be disposed at a top portion of the exterior housing 11. An open hole 112 may be provided at a side wall of the exterior housing 11. The cartridge 1 may also include a bottom base 12 disposed at an opening provided at a lower portion of the exterior housing 11. An atomizing core 13 may be disposed at an upper portion of the bottom base 12. The atomizing core 13 and the cigarette mouthpiece 111 may be connected through a vapor channel 14. An E-liquid storage tank 15 may be provided at an upper space of the cartridge 1. The E-liquid storage tank 15 and the atomizing core 13 may be connected.

The atomization generating device having the independent air intake structure may also include a main body 2. A receiving chamber 21 may be formed at an upper portion of the main body 2 for receiving the cartridge 1. An air inlet 211 may be provided at a side wall of the receiving chamber 21. The air inlet 211 of the main body 2 may correspond to and be aligned with the open hole 112 provided at the side wall of the cartridge 1 to allow the external air to be guided into the cartridge 1.

In some embodiments, an air guiding channel may be provided at the bottom base 12 of the cartridge 1. An end of the air guiding channel may be connected with the atomizing core 13. Another end of the air guiding channel may be connected with the open hole 112 of the exterior housing 11 of the cartridge 1 and the corresponding air inlet 211 of the main body 2. The air guiding channel may be configured to guide the external air into the atomizing core 13.

The air guiding channel may be configured as a bottom base through hole 121 that may extend throughout the inside of the bottom base 12 to connect with the atomizing core 13. The bottom base through hole 121 may be directly connected with the open hole 112 of the exterior housing 11 of the cartridge 1 and the corresponding air inlet 211 of the main body 2 that is aligned with the open hole 112, and may guide the external air into the atomizing core 13.

The bottom base through hole 121 may include at least one first channel 1211 disposed inwardly, and a second channel 1212 that bends and extends upwardly. The second channel 1212 may be located below the atomizing core 13 and may be connected with the atomizing core 13.

When more than one open hole 112 is provided at the side wall of the cartridge 1 and more than one corresponding air inlet 211 that is aligned with the open hole 112 is provided at the main body 2, the bottom base 12 may include the same number of bottom base through holes 121. Each bottom base through hole 121 may include the first channel 1211 and the second channel 1212. Each first channel 1211 may be connected with the atomizing core 13 through the corresponding second channel 1212. In some embodiments, the bottom base 12 may include two bottom base through holes 121 opposingly disposed at the bottom base 12.

For the convenience of use and to avoid contamination, the air guiding channel 121 on the bottom base 12 may include an air guiding groove 1213 concavely and inwardly disposed at an exterior surface of a lower portion of the bottom base 12. The bottom base through hole 121 may be disposed at an inner wall of the air guiding groove 1213, and may include the first channel 1211 and the second channel 1212. An end of the air guiding groove 1213 may be connected with the external environment through the open hole 112 provided at the side wall of the cartridge 1 and the corresponding air inlet 211 of the main body 2 that is aligned with the open hole 112, another end may be connected with the atomizing core 13 through the bottom base through hole 121. In this configuration, the bottom base through hole 121 may not be directly connected with the open hole 112 on the side wall of the cartridge 1 and the corresponding air inlet 211 on the main body 2. Rather, the bottom base through hole 121 may be connected with the open hole 112 on the side wall of the cartridge 1 and the corresponding air inlet 211 of the main body 2 through the air guiding groove 1213, thereby avoiding potential contamination that may be caused by the direct connection, and providing convenience for use. Accordingly, the external air may enter the open hole 112 on the exterior housing 11 of the cartridge 1 through the air inlet 211 on the main body 2, and enter the air guiding groove 1213 through the open hole 112 on the exterior housing 11 of the cartridge 1. The external air may then enter the first channel 1211 through the air guiding groove 1213, and enter the second channel 1212 and the atomizing core 13. The gas generated by atomizing the E-liquid by the atomizing core 13 may be guided to the cigarette mouthpiece 111 through the vapor channel 14.

For the convenience of assembling the bottom base 12 of the cartridge 1 and the exterior housing 11, embodiments of the present disclosure provide an atomization generating device including a snap-fitting structure. The atomization generating device includes features such as a novel design, being convenient for the E-liquid to enter, and being convenient for assembling. The snap-fitting structure may be formed by the open hole 112 on the exterior housing 11 of the cartridge 1 and a protrusion on the bottom base 12 of the cartridge 1. That is, a protrusion 122 may be disposed at a portion of the bottom base 12 corresponding to the open hole 112 on the exterior housing 11. The protrusion 122 may snap-fit in the open hole 112 of the exterior housing 11, thereby mounting the bottom base 12 on the exterior housing 11 of the cartridge 1 in a snap-fitting manner. Therefore, the open hole 112 on the exterior housing 11 may also be referred to as a snap-fitting hole 112. The protrusion 122 may be configured to engage with the snap-fitting hole 112 to mount the bottom base 12 to the exterior housing 11 of the cartridge 1 in the snap-fitting manner to assemble as the cartridge 1. A gap may be pre-configured between the protrusion 122 and the snap-fitting hole 112, such that the external air can conveniently enter the air guiding groove 1213 through the gap.

The snap-fitting mounting assembly may be used in combination with the bottom base through hole 121 described in the above embodiments. The bottom base through hole 121 may be horizontally disposed, opening inwardly from an exterior surface of a lower portion of the bottom base 12. That is, the bottom base through hole 121 may open inwardly toward an inside of the bottom base from the protrusion 122. In this type of configuration, the bottom base through hole 121 may be disposed inside the bottom base 12, for example, at least partially or fully inside the bottom base 12. An air inlet of the bottom base through hole 121 may be at an exterior side of the bottom base 12, and the rest of the bottom base through hole 121 may be inside the bottom base 12, without being exposed. This type of channel design has a short air flow path. The specific air flow path may be: the external air enters the bottom base through hole 121 through the gap pre-configured between the protrusion 122 and the snap-fitting hole 112, and flows inwardly through the bottom base through hole 121. The external air then enters the atomizing core 13 through the first channel 1211 and the second channel 1212, and continues to enter the cigarette mouthpiece 111 through the vapor channel 14.

To improve air intake efficiency and assembling quality, a connection mechanism may be provided on the protrusion 122. For example, a connection groove 1221 may be disposed at an exterior surface of the protrusion 122. The connection groove 1221 may be connected with the external environment through the snap-fitting hole 112 on the side wall of the exterior housing 11 of the cartridge 1, and may be connected with the atomizing core 13 through the air guiding groove 1213. The protrusion 122 may include an upper surface facing the cigarette mouthpiece 111, a lower surface facing the bottom base 12, and an exterior surface facing an exterior of the electronic cigarette. An inner surface facing an inside of the electronic cigarette may be integral with an exterior surface of the bottom base 12 of the cartridge 1 as a single piece. The connection groove 1221 may be disposed inwardly and downwardly from the exterior surface of the protrusion 122, and may extend outwardly to penetrate throughout the lower surface of the protrusion 122. The air guiding groove 1213 may be disposed below the protrusion 122 and may be connected with the connection groove 1221. The connection groove 1221 may be disposed inwardly and upwardly from the exterior surface of the protrusion 122 and may penetrate throughout the upper surface of the protrusion 122. The connection groove 1221 may be connected with the air guiding groove 1213 disposed above the protrusion 122. The connection groove 1221 may be disposed at a center portion of the protrusion 122 to penetrate throughout the upper and lower surfaces of the protrusion 122, and may be interposingly connected with the air guiding groove 1213 concavely disposed at the exterior surface of the bottom base 12 in a direction toward an inner surface of the protrusion 122.

As shown in FIG. 1-FIG. 19, there may be two snap-fitting mounting assemblies disposed at two opposing sides in a radial direction of the atomization generating device. This configuration may be implemented in, but not limited to, atomization generating devices having an oval shaped or a substantially oval shaped cross section. In some embodiments, the atomization generating device of the present disclosure may also include more than two snap-fitting structures, although more than two snap-fitting structures may increase the complexity of the product and manufacturing cost, and hence are not commonly adopted in manufacturing.

When the air guiding groove 1213 of the atomization generating device is circularly disposed concavely and inwardly from the exterior surface of the bottom base 12, i.e., when the air guiding groove 1213 has a ring shape, and is circularly disposed at the exterior surface of a lower portion of the bottom base 12, the atomization generating device provided by the embodiments of the present disclosure may also be referred to as a side air intake circular flow type atomization generating device. The ring-shaped air guiding groove 1213 may be horizontally disposed, and may be inwardly disposed from the protrusion 122 along the lower surface of the bottom base 12. In this channel design, the air guiding groove 1213 is inwardly disposed at the bottom base 12. The air guiding path is smoother and may not be prone to be clogged. The specific air flow path may be: the external air enters the air guiding groove 1213 through the gap pre-configured between the protrusion 122 and the snap-fitting hole 112 or through the connection groove 1221 disposed on the protrusion 122, and flows inwardly along the air guiding groove 1213. Then the external air enters the atomizing core 13 through the first channel 1211 and the second channel 1212. The external air continues to enter the cigarette mouthpiece 111 through the vapor channel 14.

To improve the sealing of the cartridge 1, a rubber ring 123 may be disposed to sleeve fit onto an upper portion of the bottom base 12. The bottom base 12 and the exterior housing 11 may be sealed through the rubber ring 123. Thus, the E-liquid stored in the E-liquid storage tank 15 may not leak from the space between the bottom base 12 and the exterior housing 11. The E-liquid storage tank 15 may be formed by an inner wall of the exterior housing 11, an upper portion of the bottom base 12, the vapor channel 14, and the cigarette mouthpiece 111. A pedestal 125 may be disposed between the bottom base 12 and the vapor channel 14. The atomizing core 13 may include an E-liquid guiding body 131 and a heating wire 132. The E-liquid guiding body 131 may be at least partially submerged in the E-liquid stored in the E-liquid storage tank 15. The heating wire 132 may be wounded around the E-liquid guiding body 131. An upper portion of the pedestal 125 may be connected with the vapor channel 14. A lower portion of the pedestal 125 may be connected with the upper portion of the bottom base 12. The E-liquid guiding body 131 may be inserted into the E-liquid storage tank 15 through an E-liquid inlet of the pedestal 125.

Next, the bottom base 12 is further described. A support member 124 may extend upwardly from the bottom base 12. A second channel 1212 may be disposed inside the support member 124. A depressed hole 1241 may be disposed at the support member 124. The atomizing core 13 may be mounted at least partially in the depressed hole 1241. The atomizing core 13 may be located above the second channel 1212. The pedestal 125 may be mounted at an upper portion of the support member 124. The pedestal 125 may include a separator wall 1251 located at a lower portion. The separator wall 1251 may be provided with a separator hole 1252. A connection chamber 1253 may be disposed upwardly from a lower surface of the separator wall 1251. The separator hole 1252 may correspond to the depressed hole 1241. The separator hole 1252 may be press-connected with the atomizing core 13. A top portion of the separator wall 1251 may bend upwardly and inwardly and extend to form or provide a boss 1254. The boss 1254 may be provided with a pedestal hole 1255 extending between the top and the bottom of the boss 1254. The pedestal hole 1255 may be connected with the connection chamber 1253. A bottom portion of the vapor channel 14 may be mounted at the pedestal hole 1255.

The support member 124 may include a ring shape. The inside of the support member 124 may be hollow. A center rod 126 may be disposed in the bottom base 12. The center rod 126 may be located inside the support member 124. A height of the center rod 126 may be lower than a height of the support member 124. The second channel 1212 may be provided downwardly from an upper surface of the center rod 126. An E-liquid storage gap 1261 may exist between an exterior wall of the center rod 126 and an inner wall of the support member 124, for storing excessive E-liquid.

An edge portion 127 may extend upwardly from the bottom base 12. The edge portion 127 may be located at an outer circumference of the support member 124. An upper surface of the edge portion 127 may bend outwardly to form or provide a snap-edge portion 1271. An E-liquid storage gap 1272 may exist between the edge portion 127 and the support member 124. The support member 124 may have a ring shape. The edge portion 127 may have a ring shape. The heating wire 132 of the atomizing core 13 may be wounded around the E-liquid guiding body 131. Two ends of the E-liquid guiding body 131 may be respectively located in the E-liquid storage gap 1272. The rubber ring 123 may be sleeve-fit at an outer circumference of the edge portion 127. The protrusion 122 may be disposed at a portion or location of the bottom base 12 corresponding to the snap-fitting hole 112. The rubber ring 123 may be disposed between the snap-edge portion 1271 and the protrusion 122. An exterior surface of the rubber ring 123 may abut against an inner wall of the exterior housing 11.

The support member 124 may have a ring shape. The depressed hole 1241 may be disposed downwardly from an upper surface of the support member 124. Two depressed holes 1241 may be opposingly disposed. The separator hole 1252 may be disposed upwardly from a lower surface of the separator wall 1251. Two separator holes 1252 may be opposingly disposed. The separator wall 1251 may be sleeve-fit at an outer circumference of the support member 124. An upper portion of the atomizing core 13 may be pressed by the separator hole 1252. A lower portion of the atomizing core 13 may be pressed by the depressed hole 1241.

The main body 2 may include a bottom housing 22. A battery 23, a control assembly 24, and a plastic member 25 may be mounted inside the bottom housing 22. The battery 23 and the control assembly 24 may be mounted at the plastic member 25. A sealing ring 27 may be disposed between the plastic member 25 and the bottom housing 22 to seal a gap therebetween. The sealing ring 27 may block air from flowing upwardly or downwardly through the gap between the plastic member 25 and the bottom housing 22, thereby maintaining an excellent sealing. An upper portion of the plastic member 25 and a side wall of the bottom housing 22 may form the receiving chamber 21. The plastic member 25 may be provided with an airflow sensing channel 251 and a first protrusion 252. Two first channels 1211 may be disposed inwardly from an inner wall of the air guiding groove 1213. The two first channels 1211 may be respectively disposed at two opposing sides of the air guiding groove 1213. Each first channel 1211 may be downwardly provided with a third channel 1214. Two third channels 1214 may be opposingly disposed upwardly at a lower surface of the bottom base 12. One of the two third channels 1214 may be connected with the airflow sensing channel 251, another one of the two third channels 1214 may be provided with the first protrusion 252. A lower portion of the airflow sensing channel 251 may be connected with a pressure sensor. An upper surface of the plastic member 25 may be provided with a first groove 253. The airflow sensing channel 251 and the first protrusion 252 may be connected through the first groove 253.

Compared with a conventional design, the atomization generating device provided by the present disclosure provides a drastically different structure for external air to enter the atomizing core 13. The issue related to an insufficient air intake amount caused by the size of the gap between the cartridge 1 and the receiving chamber 21 in a conventional design is resolved. That is, the issue related to an insufficient air intake amount caused by the sizes of the cartridge 1 and the receiving chamber 21 in a conventional design is resolved. The disclosed atomization generating device may include the air inlet 211 provided at an exterior wall of the receiving chamber 21. The external air may sequentially enter the atomizing core 13 through the snap-fitting hole 112, the air guiding groove 1213, the first channel 1211, and the second channel 1212. The gas generated by atomizing the E-liquid can be directed out of the electronic cigarette timely, thereby avoiding the deficiency of having an insufficient amount of air intake due to an overly small gap. As a result, the texture of the E-liquid can be enhanced. The atomization of the E-liquid is more thorough, and the texture is finer.

As shown in FIG. 1-FIG. 19, the present disclosure also provides an atomization generating device having a reverse power supply avoidance function. That is, the atomization generating device includes a feature of avoiding reverse plugging that may provide a reverse power supply to the atomizing core 13. The present disclosure may be implemented as an atomization generating device, including: a cartridge including an exterior housing and a bottom base mounted at an opening of a lower portion of the exterior housing. The bottom base may include a center line extending between the top and the bottom of the bottom base. An atomizing core may be mounted at an upper portion of the bottom base. The atomization generating device may also include a body including a bottom housing. A battery, a control assembly, and a plastic member may be mounted at a lower portion inside the bottom housing. The plastic member may include a first end wall located at an upper portion of the plastic member and a second end wall located at a lower portion of the plastic member. The battery and the control assembly may be mounted between the first end wall and the second end wall. A receiving chamber may be formed by an upper portion of the first end wall and a side wall of an upper portion of the bottom housing. The receiving chamber may be configured to receive and mount the cartridge. The battery may be connected with the control assembly, which may be configured to supply an electric power to the atomizing core and to control the operation of the atomizing core. In some embodiments, corresponding engageable connection members may be provided at the bottom base of the cartridge and the plastic member of the body. The engageable connection members may be configured to connect the cartridge and the plastic member only in a predetermined direction, such that the electric power is supplied to the atomizing core in a fixed electric current direction.

The atomization generating device having the reverse power supply avoidance function provided by the present disclosure may be an atomization generating device having a foolproof structure. The structures of the cartridge and body of the atomization generating device that are the same as or similar to those of the above embodiments are not repeatedly described.

The plastic member 25 of the atomization generating device having the reverse power supply avoidance function may include a first end wall 254 located at an upper portion and a second end wall 255 located at a lower portion of the plastic member 25. The battery 23 and the control assembly 24 may be mounted between the first end wall 254 and the second end wall 255. The control assembly 24 may include an airflow sensor 241 and a sealing assembly 242. The sealing assembly 242 may include a receiving groove 2421 and an air guiding tube 2422. The receiving groove 2421 may be connected with the air guiding tube 24212. The airflow sensor 241 may be mounted in the receiving groove 2421. The first end wall 254 may be provided with a first air guiding channel 2541. A lower portion of the first air guiding channel 2541 may be connected with an upper portion of the air guiding tube 2422. An upper end of the first air guiding channel 2541 may be connected with a lower portion of the third channel 1214. The battery 23 may be located below the control assembly 24. The sealing ring 27 may seal a space between a side surface of the first end wall 254 and the bottom housing. An upper portion of the first end wall 254 and the side wall of the bottom housing may form the receiving chamber 21.

The first air guiding channel 2541 may protrude from an upper surface of the first end wall 254. A lower surface of the bottom base 12 may be provided with a second groove 1232. The second groove 1232 may be located at a circumference of the third channel 1214. A top portion of the first air guiding channel 2541 may be inserted into the second groove 1232. The first air guiding channel 2541 may protrude from a lower surface of the first end wall 254. The air guiding tube 2422 may be located above the receiving groove 2421. A lower end of the first air guiding channel 2541 may be inserted into the upper portion of the air guiding tube 2422. An upper surface of the first end wall 254 may be provided with a first groove 2542. The air guiding groove 1213 may have a ring shape, and may be circularly disposed at an exterior surface of a lower portion of the bottom base 12. The air guiding groove 1213 may be horizontally disposed. When observed horizontally, the second channel 1212 and the third channel 1214 may not be located on a same straight line. This configuration can block excessive E-liquid (condensed fluid) from entering the third channel 1214 that is connected with the first air guiding channel 2541.

A first snap-connecting member 128 may be disposed at a lower surface of the bottom base 12. A center line may be defined at the bottom base 12 that extends between the top and the bottom. An upper portion of the first end wall 254 and a side wall of the bottom housing 21 may form the receiving chamber 212. An upper surface of the first end wall 254 may be provided with a second snap-connecting member 256. When the cartridge 1 is loaded into the receiving chamber 21 along the center line, the first snap-connecting member 128 and the second snap-connecting member 256 may engage with one another, such that the cartridge 1 can be correctly loaded into the receiving chamber 21. When the cartridge 1 is rotated for an angle around the center line, the first snap-connecting member 128 and the second snap-connecting member 256 may not be engaged with one another, such that the cartridge 1 may not be correctly loaded into the receiving chamber 21. A lower surface of the bottom base 12 may be provided with a second groove 1232. In some embodiments, the first snap-connecting member 128 may be the second groove 1232. The first air guiding channel 2541 may be disposed at the first end wall 254. The first air guiding channel 2541 may protrude from an upper surface of the first end wall 254. The second snap-connecting member 256 may be the first air guiding channel 2541 that protrudes from the first end wall 254. The first air guiding channel 2541 may be inserted in the second groove 1232, which may be the location where the cartridge 1 can be correctly loaded into the receiving chamber 21.

The cartridge 1 may be rotated for an angle θ around the center line, 0°<θ<180° or θ=180°. The air inlet 211 may be disposed at the bottom housing 22. The air inlet 211 may be connected with the receiving chamber 21. The air inlet 211 may correspond to the snap-fitting hole 112. An upper end of the first air guiding channel 2541 may be connected with a lower portion of the third channel 1214. An upper end of the first air guiding channel 2541 may be inserted in the second groove 1215.

Lead terminals 1233 and a first magnet 1234 may be mounted in the bottom base 12. The lead terminals 1233 and the first magnet 1234 may be exposed at the lower surface of the bottom base 12. Connection terminals 2543 and a second magnet 2544 may be mounted at the first end wall 254. The connection terminals 2543 and the second magnet 2544 may be exposed at the upper surface of the first end wall 254. When the cartridge 1 is correctly loaded into the receiving chamber 21, the lead terminals 1233 and the connection terminals 2543 are connected to establish an electrical connection therebetween. The first magnet 1234 and the second magnet 2544 attract one another to bring the cartridge 1 and the main body 2 into tight or close contact. Two lead terminals 1233 and two first magnets 1234 may be located on the same straight line L1, and the first snap-connecting member 128 may not be on the straight line L1. Two connection terminals 2543 and two second magnets 2544 may be located on the same straight line L2, and the second snap-connecting member 256 may not be on the straight line L2.

In some embodiments, a cross section may be defined. The center line may be perpendicular to the cross section. The cross section of the cartridge 1 may include two first long sides 1235 and two first short sides 1236. The two first long sides 1235 may be opposingly disposed. The two first short sides 1236 may be opposingly disposed. The first long sides 1235 may be connected with the first short sides 1236. A length of the first long side 1235 may be greater than a length of the first short side 1236.

In some embodiments, a cross section may be defined. The center line may be perpendicular to the cross section. The cross section of the bottom housing 22 may include two second long sides 2241 and two second short sides 2242. The two second long sides 2241 may be opposingly disposed. The two second short sides 2242 may be opposingly disposed. The second long sides 2241 may be connected with the second short sides 2242. A length of the second long side 2241 may be greater than a length of the second short side 2242, thereby avoiding rolling of the bottom housing/body on a tabletop.

The atomization generating device having the reverse power supply avoidance function provided by the present disclosure may be a dual conversion blind-insertion atomization generating device. The disclosed atomization generating device has features such as a reasonable configuration, a compact structure, and dual-direction docking and charging. The structures of the cartridge and body of the atomization generating device are the same as or similar to those described above in the previous embodiments, which are not repeatedly described here.

As shown in FIG. 1-FIG. 19, a third end wall 258 may be disposed between the first end wall 254 and the second end wall 256 of the dual-conversion blind-insertion type atomization generating device. The control assembly 24 may be disposed between the first end wall 254 and the third end wall 258. A snap cover 244 may be disposed between the first end wall 254 and the third end wall 258. The snap cover 244 may cover the control assembly 24. The battery 23 may be mounted between the second end wall 255 and the third end wall 258. The third end wall 258 may be provided with an electrical circuit adapter 26. The electrical circuit adapter 26 may include a first socket 261, a second socket 262, and a third socket 263. The first socket 261 and the third socket 263 may be respectively located at two sides of the second socket 262, and may be symmetrically distributed with respect to the second socket 262. The first docket 261, the second socket 262, and the third socket 263 may be respectively connected with the control assembly 24. The second end wall 255 may be provided with a third magnet 2551. The first socket 261, the second socket 262, the third socket 263, and the third magnet 2551 may be exposed at the third end wall 258.

The control assembly 24 may include an electrical circuit board 243. A side of the electrical circuit board 243 may be disposed with an LED lamp and a light absorbing cover 245. The snap cover 244 may include a lamp hole 2441. A light hole 213 may be disposed at a location or portion of the bottom housing 22 corresponding to the lamp hole 2441. A light transmissive member 246 may be mounted at the lamp hole 2441. The light transmissive member 246 may be at least partially located in the light hole 233. The light generated by the LED lamp may be transmitted out through the light transmissive member 246. The light absorbing cover 245 may be located adjacent (e.g., around) the LED lamp. A side of the light absorbing cover 245 may abut against the electrical circuit board 243. Another side of the light absorbing cover 245 may abut against an inner wall of the snap cover 244.

In some embodiments, a cross section may be defined. The cross section may be parallel to the first end wall 254. The cross section of the plastic member 25 may include two plastic long sides and two plastic short sides. The two plastic long sides may be opposingly disposed. The two plastic short sides may be opposingly disposed. The plastic long sides may be connected with the plastic short sides. A length of the plastic long side may be greater than a length of the plastic short side. An opening 2581 may be provided at one of the plastic long sides, and a longitudinal groove 2582 may be provided at another one of the plastic long sides. A snap-hold groove 221 may be disposed at a bottom portion of the bottom housing 22. A snap boss 2442 may be disposed at a bottom portion of the plastic member 25. The snap boss 2442 may snap-fit with the snap-hold groove 221 to block the plastic member 25 from being loaded into the bottom housing 22 from a lower portion, which may cause the displacement of the plastic member 25 to be too large. The disclosed configuration can also avoid the plastic member 25 becoming loose and shaking.

The dual-conversion blind-insertion type atomization generating device may also include a charging base 3. The charging base 3 may include a charging exterior housing 32 and a charging body 31. An opening may be provided at an upper portion of the charging exterior housing 32. The charging exterior housing 32 may wrap the charging body 31. A charging docking chamber may be disposed at the charging exterior housing 32 and an upper surface of the charging body 31. The bottom portion of the main body 2 may be configured for mounting the charging docking chamber. The charging body 31 may be provided with a first charging terminal 311, a second charging terminal 312, and a third charging terminal 313. The first charging terminal 31 and the third charging terminal 313 may be respectively located at two sides of the second charging terminal 312, and may be symmetrically distributed with respect to the second charging terminal 312. The first charging terminal 311 may be inserted into the first socket 261. The second charging terminal 312 may be inserted into the second socket 262. The third charging terminal 313 may be inserted into the third socket 263. The charging body 31 may be provided with a fourth magnet 33. The fourth magnet 33 and the third magnet 2551 may attract one another. The first charging terminal 311, the second charging terminal 312, the third charging terminal 313, and the fourth magnet 33 may be exposed at the charging docking chamber. Two fourth magnets 33 may be respectively located at two sides of the first charging terminal 311 and the third charging terminal 313. The two fourth magnets 33, the first charging terminal 311, the second charging terminal 312, and the third charging terminal 313 may be located on a same straight line. Two third magnets 2551 may be respectively located at two sides of the first socket 261 and the third socket 263. The two third magnets 2551, the first socket 261, the second socket 262, and the third socket 263 may be located on a same straight line.

During charging, the charging base 3 may be sleeve-fit at a bottom portion of the main body 2. The user may not need to consider the positive and reverse directions of the charging base 3. Because the first charging terminal 311 and the third charging terminal 313 are respectively located at two sides of the second charging terminal 312, and are symmetrically distributed with respect to the second charging terminal 312, and because two fourth magnets 33 are respectively located at two sides of the first charging terminal 311 and the third charging terminal 313, and are symmetrically distributed, at the bottom portion of the main body 2, the first socket 261 and the third socket 263 are respectively located at two sides of the second socket 262, and are symmetrically distributed with respect to the second socket 262. In addition, the second end wall 255 may be provided with the third magnet 2551. Two fourth magnets 33 may respectively attract two third magnets 2551. The first charging terminal 311 may be inserted into the first socket 261, the third charging terminal 313 may be inserted into the third socket 263, and the second charging terminal 312 may be inserted into the second socket 262. For example, the second charging terminal 312 may be connected with the positive terminal, the first charging terminal 311 and the third charging terminal 313 may be connected with the negative terminal. When reversely inserted, the second charging terminal 312 still connects with the positive terminal, and the first charging terminal 311 and the third charging terminal 313 still connect with the negative terminal, thereby realizing the charging of the battery from an external power source. The user may not have to consider the insertion direction.

The present disclosure also provides a press-connection method for connecting the terminals of an atomization generating device, and an atomization generating device manufactured using the press-connection method. Using the press-connection method, the connection security of the terminals is significantly increased, thereby effectively avoiding the falling off or separation due to external forces. In addition, the disclosed method can effectively avoid the scenarios in which the heating wire and the lead terminals are separated due to the assembling and external forces. As a result, the atomization generating device includes features such as secure connections and a long lifetime. The structure of the cartridge and body of the atomization generating device may be the same as or similar to those described above in the previous embodiments, which are not repeatedly described here.

As shown in FIG. 1-FIG. 9, embodiments of the present disclosure provide a press-connection method for connecting terminals of an atomization generating device. The method may include the following steps:

a. providing a bottom base 12. A support member 124 and a center rod 126 may extend from the bottom base 12. A loading hole 1242 may be downwardly provided at an upper surface of the support member 124. The center rod 126 may be located inside the support member 124. An inner wall of the support member 124 and an exterior wall of the center rod 126 may be at least partially hollowed out. A bottom portion of the center rod 126 and a bottom portion of the support member 124 may be connected through a connecting wall 1243. The method may also include providing an insertion hole 1244 disposed upwardly from a lower surface of the bottom base 12. The insertion hole 1244 may extend throughout the connecting wall 1243, and form a passing hole 1254 at the connecting wall 1243. A diameter of the insertion hole 1244 may be greater than a diameter of the passing hole 1254.

b. providing an atomizing core 13. The atomizing core 13 may include an E-liquid guiding body 131 and a heating wire 132. The heating wire 132 may be wounded around the E-liquid guiding body 131. Two ends of the heating wire 132 may respectively include an extending member 1321. The extending member 1321 may be disposed at an inner side of the support member 124. The E-liquid guiding body 131 may be aligned with the loading hole 1241. When the atomizing core 13 is pushed downwardly, the extending member 1231 may enter the hollowed out areas of the inner wall of the support member 124 and the exterior wall of the center rod 126. When the atomizing core 13 is further pushed downwardly, the extending member 1321 may enter the passing hole 1245, and enter the insertion hole 1244 along the passing hole 1245. Finally, the extending member 1321 may protrude from a lower surface of the bottom base 12. A lower portion of the E-liquid guiding body 131 may be press-connected with the loading hole 1242.

c. providing a rubber sleeve 16 having a sleeve hole 161. The extending member 1321 may be inserted into the sleeve hole 161, and the rubber sleeve 16 may be mounted in the insertion hole 1244.

d. providing lead terminals 1233. The lead terminals 1233 may be inserted into the sleeve hole 161, such that an exterior wall of the lead terminals 1233 presses the extending member 1231.

In step d, an end of the extending member 1231 may be fixed, and the lead terminals 1233 may be inserted upwardly into the sleeve hole 161, such that the extending member 1231 is tightly fixed between the lead terminals 1233 and the sleeve hole 161.

In step c, the rubber sleeve 16 may be mounted upwardly into the insertion hole 1244, such that the rubber sleeve 16 abuts against a top wall of the insertion hole 1244.

In step b, the extending member 1231 may be moved downwardly to protrude from a lower surface of the bottom base 12. After a lower portion of the E-liquid guiding body 131 is press-connected with the loading hole 1242, the extending member 1321 may be pulled downwardly by a force, such that the E-liquid guiding body 131 tightly presses the loading hole 1242.

After step d, the method may also include providing a pedestal 125. The pedestal 125 may include a separator wall 1251 located at a lower portion. The separator wall 1251 may include a separator hole 1252. A connecting chamber 1253 may be provided upwardly from a lower surface of the separator wall 1251. A boss 1254 may extend upwardly from a top portion of the separator wall 1251 and bend inwardly. The boss 1254 may penetrate throughout a pedestal hole 1255 between top and bottom of the boss 1254. The pedestal hole 1255 may be connected with the connecting chamber 1253. The pedestal 125 may be disposed at an upper portion of the support member 124, such that the separator hole 1252 is press-connected with the E-liquid guiding body 131.

The present disclosure adopts a press-connection method to connect the heating wire 132 to the lead terminals 1233, thereby realizing the connection between the heating wire 132 and the lead terminals 1233. Using the tight pressing method, the security of the connection is significantly enhanced. The scenarios of falling off or separating of parts of the electronic cigarette under an external force can be avoided. The scenarios of the heating wire 132 and the lead terminals 1233 separating from one another caused by the assembling process and external forces can be effectively avoided.

The present disclosure also provides an atomization generating device manufactured with terminals mounted using the above-described press-connection method.

The air flow path according to some embodiments of the present disclosure can be briefly described as follows:

The external air may enter the snap-fitting hole 112 through the air inlet 211, and enter the air guiding groove 1213 through the snap-fitting hole 112. Then the external air may enter the first channel 1211 through the air guiding groove 1213. The external air may then enter the second channel 1212. The gas generated when the E-liquid is atomized by the atomizing core 13 may be guided to the cigarette mouthpiece 111 through the vapor channel 14. Specifically, the E-liquid stored in the E-liquid storage tank 15 may be absorbed by the E-liquid guiding body 131. The heating wire 132 may heat the E-liquid absorbed by the E-liquid guiding body 131 to atomize the E-liquid. The gas generated from the atomization may move upwardly to reach the connection chamber 1253, and continue to move upwardly to enter the pedestal hole 1255. The gas may then enter the bottom portion of the vapor channel 14, and finally flow into the cigarette mouthpiece.

The air flow path according to other embodiments of the present disclosure can be briefly described as follows:

During smoking, the external air may enter the snap-fitting hole 112 through the air inlet 211, and enter the air guiding groove 1213 through the snap-fitting hole 112. The external air may then enter two first channels 1211 through the air guiding groove 1213. One of the first channels 1211 may be connected with the third channel 1214. The third channel 1214 may be connected with the first air guiding channel 2541. The first air guiding channel 2541 may be connected with the air guiding tube 2422. Thus, the external air may enter the first channel 1211. When the pressure inside the first channel 1211 changes, the pressure inside the third channel 1214, the first air guiding channel 2541, and the air guiding tube 2422 may also change. Accordingly, the airflow sensor 241 may sense the change in the air flow. The airflow sensor 241 may transmit signals to the control assembly. The control assembly may control the operation of the atomizing core 13, such as atomizing the E-liquid, based on the signals received from the airflow sensor 241. When smoking is stopped, the pressure of the external air is the same as the pressure inside the first channel 1211, the third channel 1214, the first air guiding channel 2541, and the air guiding tube 2422. The airflow sensor 241 may not sense a change in the air flow. Hence, the control assembly may control the atomizing core 13 to stop atomizing the E-liquid.

The electrical circuit of the present disclosure can be briefly described as follows:

The battery 23 may be connected with the control assembly 24, and connected with the connection terminals in the plastic member 25 through the control assembly 24. The connection terminals may be connected with the lead terminals in the bottom base 12. The lead terminals may be connected with the two ends of the heating wire 132 to provide electric energy to the heating wire 132. The control assembly 24 may control the operation mode of the atomizing core 13, such as the change in the heating power. The control assembly 24 may include an electrical circuit board.

The fluid path of the E-liquid according to the present disclosure can be briefly described as follows:

The E-liquid stored in the E-liquid storage tank 15 may be absorbed by the E-liquid guiding body 131. The heating wire 132 may atomize the E-liquid absorbed by the E-liquid guiding body 131. The excessive E-liquid on the E-liquid guiding body 131 may drip downwardly to enter the E-liquid storage gap 1261 between the exterior wall of the center rod 126 and the inner wall of the support member 124, thereby avoiding the excessive E-liquid (condensed fluid) entering the second channel 1212. When the E-liquid stored in the E-liquid storage tank 15 is consumed up, the E-liquid can first enter the E-liquid storage gap 1261 between the edge portion 127 and the support member 124, and then be absorbed by two ends of the E-liquid guiding body 131.

The above described are merely some embodiments of the present disclosure, which do not limit the scope of the present disclosure. Any modification, equivalent substitution, or improvement within the spirit and principle of the present disclosure fall within the scope of protection of the present disclosure.

What is claimed is:

1. An atomization generating device, comprising:
   a cartridge including:
   an exterior housing having an opening at a lower portion of the exterior housing, wherein a cigarette mouthpiece is provided at a top portion of the exterior housing, and a side wall of the exterior housing is provided with an open hole; and
   a bottom base mounted at the opening located at the lower portion of the exterior housing, wherein an upper portion of the bottom base is mounted with an atomizing core, and the atomizing core is connected with the cigarette mouthpiece through a vapor channel; and
   a main body including:
   a bottom housing,
   a battery, a control assembly, and a plastic member disposed inside the bottom housing, wherein the battery is connected with the control assembly to provide an electric power to the atomizing core and the control assembly is configured to control operations of the atomizing core,
   a sealing ring arranged between the plastic member and the bottom housing,
   a receiving chamber formed by an upper portion of the plastic member and a side wall of the bottom housing, wherein the receiving chamber is configured to receive the cartridge,
   an air inlet provided at a side wall of the receiving chamber, the air inlet corresponding to the open hole provided at the exterior housing of the cartridge to guide an external air into the cartridge,
   wherein an air guiding channel is provided at the bottom base of the cartridge, an end of the air guiding channel being connected with the atomizing core, another end of the air guiding channel being connected with the open hole provided at the exterior housing of the cartridge and the corresponding air inlet on the main body, and
   wherein the air guiding channel is configured to guide the external air into the atomizing core,
   wherein the bottom base of the cartridge includes a protrusion configured to snap-fit in the open hole provided on the side wall of the exterior housing of the cartridge,
   wherein when the protrusion is engaged with the open hole the side wall of the exterior housing of the cartridge, a gap is maintained between the protrusion and the open hole to allow the external air to flow into the air guiding channel, and the air inlet on the main body is aligned with the open hole on the side wall of the exterior housing of the cartridge with the protrusion snap-fit in the open hole, wherein the control assembly includes an airflow sensor and a sealing assembly, the sealing assembly includes a receiving groove, and the airflow sensor is mounted in the receiving groove; and an electrical circuit adapter including a first socket, a second socket, and a third socket, wherein the first socket and the third socket are respectively located at two sides of the second socket and are symmetrically distributed with respect to the second socket, and wherein the first socket, the second socket, and the third socket are respectively connected with the control assembly.

2. The atomization generating device of claim 1, wherein the air guiding channel is an air guiding groove concavely and inwardly disposed at an exterior surface of a lower portion of the bottom base, an end of the air guiding groove is connected with an external environment through the open hole disposed at the exterior housing of the cartridge and the corresponding air inlet provided at the main body, another end of the air guiding groove is connected with the atomizing core through a bottom base through hole disposed at an inner wall of the air guiding groove, and the air guiding groove is configured to guide the external air into the atomizing core.

3. The atomization generating device of claim 2, wherein the bottom base through hole includes at least one first channel that is inwardly disposed, each first channel is configured to bend upwardly and extend to provide a second channel, and the second channel is located below the atomizing core and connected with the atomizing core.

4. The atomization generating device of claim 3, wherein the bottom base includes:

a support member configured to extend upwardly, wherein a second channel is disposed inside the support member, a depressed hole is provided at the support member, the atomizing core is at least partially mounted in the depressed hole, and the atomizing core is located above the second channel; and a pedestal disposed at an upper portion of the support member, wherein the pedestal includes a separator wall disposed at a lower portion of the pedestal, a separator hole is provided at the separator wall, a connection chamber is upwardly disposed at a lower surface of the separator wall, the separator hole corresponds to the depressed hole, the separator hole is press-connected with the atomizing core, a top portion of the separator wall bends and extends upwardly and inwardly and to form a boss, the boss includes a pedestal hole extending throughout the boss from top to bottom, the pedestal hole is connected with the connection chamber, and a bottom portion of the vapor channel is mounted to the pedestal hole, wherein the support member has a ring shape, an inside of the support member is at least partially hollow, a center rod is disposed at the bottom base, the center rod is located inside the support member, a height of the center rod is lower than a height of the support member, the second channel is downwardly disposed from an upper surface of the center rod, the air guiding groove is provided at the bottom base, the first channel is inwardly disposed at an inner wall of the air guiding groove, and the first channel is connected with a bottom portion of the second channel, and wherein a storage gap exists between an exterior wall of the center rod and an inner wall of the support member for storing excessive E-liquid.

5. The atomization generating device of claim 2, wherein the air guiding groove is circularly and inwardly disposed along an exterior surface of the bottom base, or the air guiding groove has a ring shape and is circularly disposed at the exterior surface of the lower portion of the bottom base, and wherein the atomization generating device is a side air intake circular flow type atomization generating device.

6. The atomization generating device of claim 1, wherein a connection grove is concavely and inwardly disposed at an exterior surface of the protrusion, the connection groove being connected with an external environment through the snap-fitting hole provided at the exterior housing of the cartridge, and connected with the atomizing core through the air guiding groove.

7. The atomization generating device of claim 1, wherein the plastic member is provided with an airflow sensing channel and a first protrusion, two first channels are provided inwardly at an inner wall of the air guiding groove, the two first channels are respectively disposed at two opposing sides of the air guiding groove, each of the two first channels extends downwardly to provide a third channel, two third channels are opposingly disposed upwardly from a lower surface of the bottom base, one of the two third channels is connected with the airflow sensing channel, another one of the two third channels is provided with a protrusion, a lower portion of the airflow sensing channel is provided with a pressure sensor, a first groove is provided at an upper surface of the plastic member, and the airflow sensing channel is connected with the first groove through the first protrusion.

8. The atomization generating device of claim 1, wherein the bottom base of the cartridge includes a center line extending in an up-down direction, the plastic member includes a first end wall located at an upper portion and a second end wall located at a lower portion, the battery and the control assembly are mounted between the first end wall and the second end wall, an upper portion of the first end wall and a side wall of an upper portion of the bottom base form the receiving chamber, and corresponding engageable connection members are provided at the bottom base of the cartridge and the plastic member of the main body, the engageable connection members are configured to connect the cartridge and the plastic member only in a predetermined direction such that an electric power is supplied to the atomizing core in a fixed electric current direction.

9. The atomization generating device of claim 8, wherein the engageable connection members form a foolproof structure including a first snap-connecting member disposed at the lower surface of the bottom base and a second snap-connecting member disposed at an upper surface of the first end wall, when the cartridge is loaded into the receiving chamber along the center line, the first snap-connecting member and the second snap-connecting member engage with one another such that the cartridge is correctly loaded into the receiving chamber, when the cartridge is rotated for an angle around the center line, the first snap-connecting member and the second snap-connecting member are not engaged with one another, and the cartridge is not correctly loaded into the receiving chamber, the angle for which the cartridge is rotated around the center line is θ, 0°<θ<180° or θ=180°.

10. The atomization generating device of claim 9, wherein a second groove is provided at the lower surface of the bottom base, the first snap-connecting member is the second groove, and a first air guiding channel is provided at the first end wall, the first air guiding channel protrudes from the upper surface of the first end wall, the second snap-connecting member is the first air guiding channel protruding from the first end wall, the first air guiding channel is inserted in the second groove to provide a location for the cartridge to be correctly loaded into the receiving chamber.

11. The atomization generating device of claim 9, wherein the bottom base is provided with lead terminals and a first magnet, the lead terminals and the first magnet are exposed at the lower surface of the bottom base, the first end wall is provided with connection terminals and a second magnet, the connection terminals and the second magnet are exposed at the upper surface of the first end wall, and when the cartridge is correctly loaded into the receiving chamber, the lead terminals and the connection terminals are connected to establish an electrical connection therebetween, and the first magnet and the second magnet attract one another to bring the cartridge and the main body into tight contact with one another.

12. The atomization generating device of claim 11, wherein two lead terminals and two first magnets are located on a same straight line L1, the first snap-connecting member is not located on the straight line L1, and two connection terminals and two second magnets are located on a same straight line L2, and the second snap-connecting member is not located on the straight line L2.

13. The atomization generating device of claim 8, wherein a third end wall is disposed between the first end wall and the second end wall of the plastic member, the control assembly is mounted between the first end wall and the third end wall, a snap cover is disposed between the first end wall and the third end wall, the snap cover covering the control assembly, the battery is mounted between the second end wall and the third end wall, the engageable connection members include the electrical circuit adapter disposed at the third end wall, a third magnet is provided at the second end wall, and the first socket, the second socket, and the third magnet are exposed at the third end wall.

14. The atomization generating device of claim 1, further comprising:

a charging base including a charging body and a charging exterior housing that wraps the charging body, wherein an opening is provided at an upper portion of the charging exterior housing, a charging docking chamber provided at the charging exterior housing and an upper surface of the charging body, wherein the charging docking chamber is mounted at a bottom portion of the main body of the atomization generating device, wherein the charging body includes a first charging terminal, a second charging terminal, and a third charging terminal, the first charging terminal and the third charging terminal are respectively located at two sides of the second charging terminal and are symmetrically distributed with respect to the second charging terminal, and wherein the first charging terminal is inserted into the first socket, the second charging terminal is inserted into the second socket, and the third charging terminal is inserted into the third socket.

15. The atomization generating device of claim 1, wherein the bottom base of the cartridge includes a support member, a center rod, a loading hole, a connecting wall, an insertion hole, and a passing hole, a diameter of the insertion hole is greater than a diameter of the passing hole, the atomizing core of the cartridge includes an E-liquid guiding body and a heating member, two ends of the heating member each include an extending member, when the atomizing core is pushed downwardly, the extending member enters the passing hole and arrives at the insertion hole, and protrudes from a lower surface of the bottom base, a lower portion of the E-liquid guiding body is press-connected at the loading hole, the cartridge also includes a rubber sleeve having a sleeve hole configured to receive the extending member inserted therein, and the cartridge also includes lead terminals configured to be inserted into the sleeve hole of the rubber sleeve such that an exterior wall of the lead terminals presses the extending member.

* * * * *